United States Patent
Kusakabe

[11] Patent Number: 5,170,046
[45] Date of Patent: Dec. 8, 1992

[54] DATA TRANSFER SYSTEM
[75] Inventor: Susumu Kusakabe, Kanagawa, Japan
[73] Assignee: Sony Corporation, Tokyo, Japan
[21] Appl. No.: 620,219
[22] Filed: Nov. 30, 1990
[30] Foreign Application Priority Data Nov. 30, 1989 [JP] Japan .................. 1-311691

[51] Int. Cl.$^5$ .......... G06K 19/06; G06K 5/00
[52] U.S. Cl. .................. 235/492; 235/380; 235/437
[58] Field of Search .......... 235/380, 492, 487, 436, 235/437, 438; 371/37.1; 455/304, 315

[56] References Cited

U.S. PATENT DOCUMENTS

| | | | |
|---|---|---|---|
| 4,720,626 | 1/1988 | Nishikawa et al. | 235/492 |
| 4,791,285 | 12/1988 | Ohki | 235/492 |
| 4,795,898 | 1/1989 | Berstein et al. | 235/487 |
| 4,797,541 | 1/1989 | Billings et al. | 235/493 |
| 4,814,595 | 3/1989 | Giboa | 235/492 |
| 4,896,025 | 1/1990 | Hasegawa | 235/437 |
| 4,908,502 | 3/1990 | Jackson | 235/438 |
| 4,930,129 | 5/1990 | Takahira | 371/40.4 |
| 4,973,828 | 11/1990 | Naruse et al. | 235/380 |

FOREIGN PATENT DOCUMENTS

| | | |
|---|---|---|
| 0308183 | 3/1989 | European Pat. Off. . |
| 2591006 | 6/1987 | France . |
| 2612317 | 3/1988 | France . |
| 62-130484 | 6/1987 | Japan . |
| 1-213774 | 8/1989 | Japan . |

Primary Examiner—Eugene R. LaRoche
Assistant Examiner—Tan Nguyen
Attorney, Agent, or Firm—Hill, Van Santen, Steadman & Simpson

[57] ABSTRACT

A data transfer system for transmitting information from a portable device to at least one outside reading device, the portable device having first memory, the first memory storing the information which comprises a plurality of data blocks involving an error check data, the outside reading device reading the data blocks corrected by the error check data which is transmitted from the portable device.

9 Claims, 15 Drawing Sheets

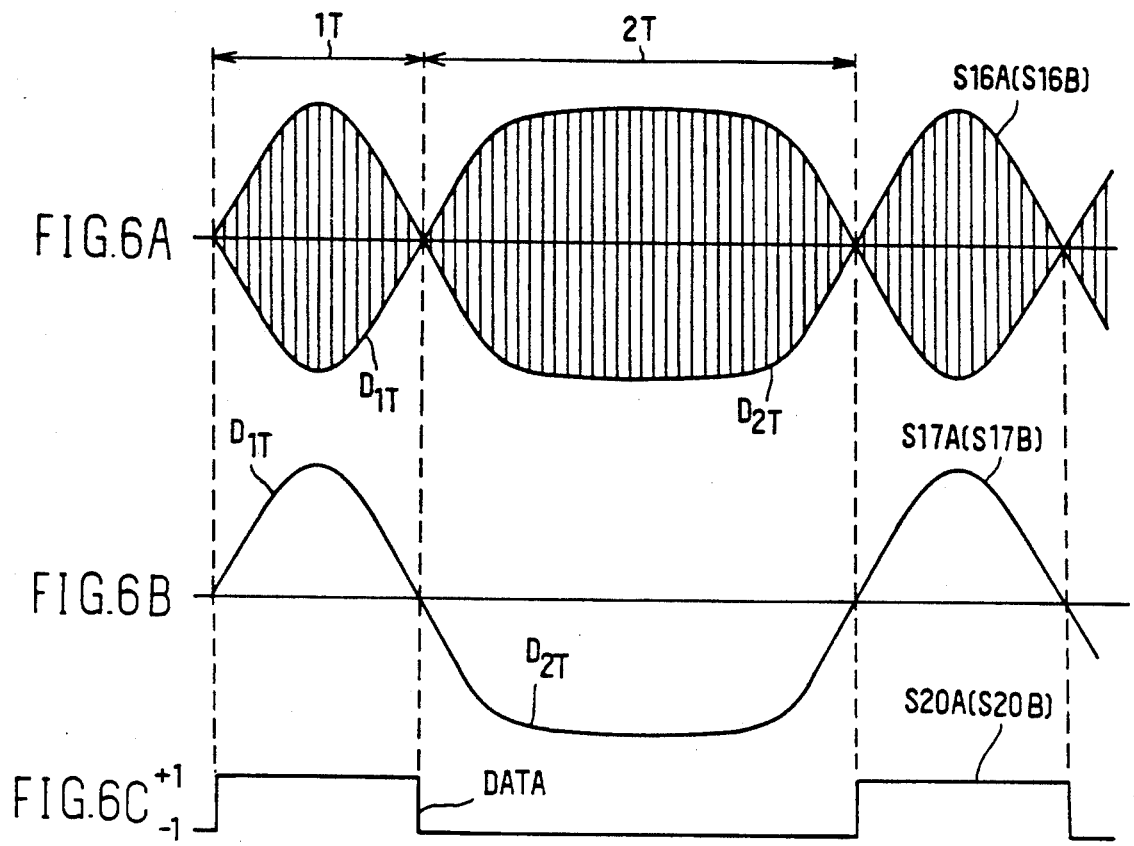
FIG. 6A
FIG. 6B
FIG. 6C
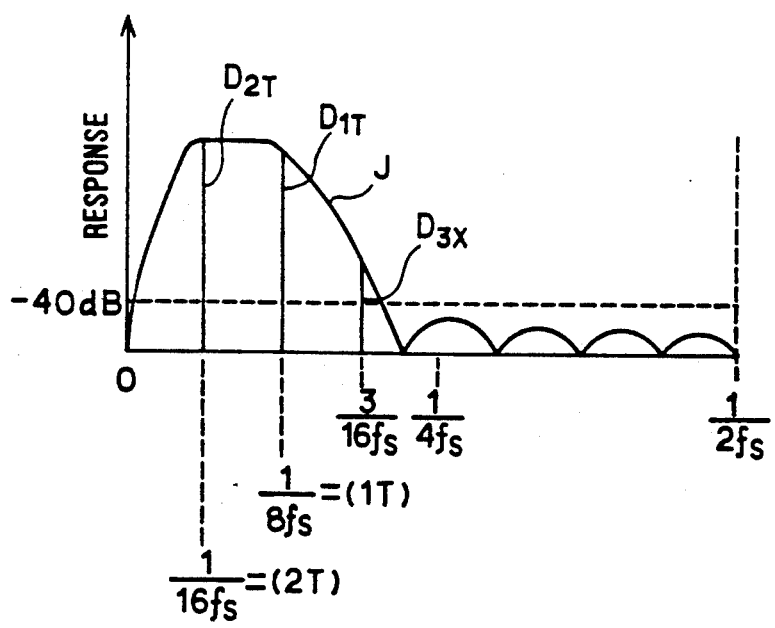
FIG. 7

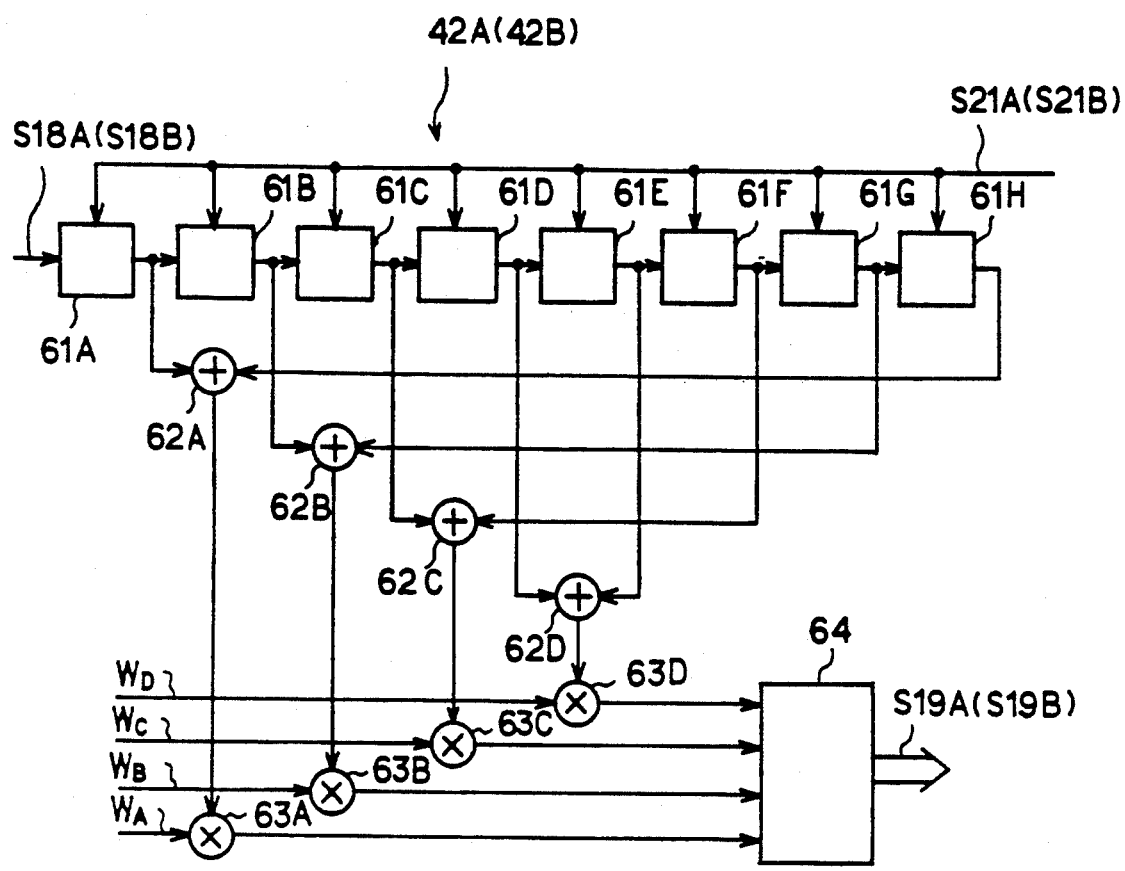
FIG. 8
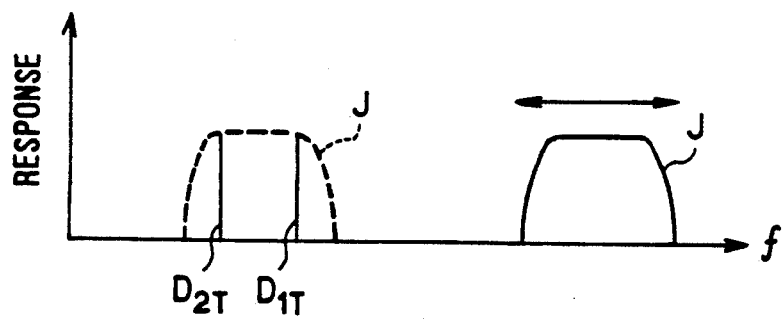
FIG. 9
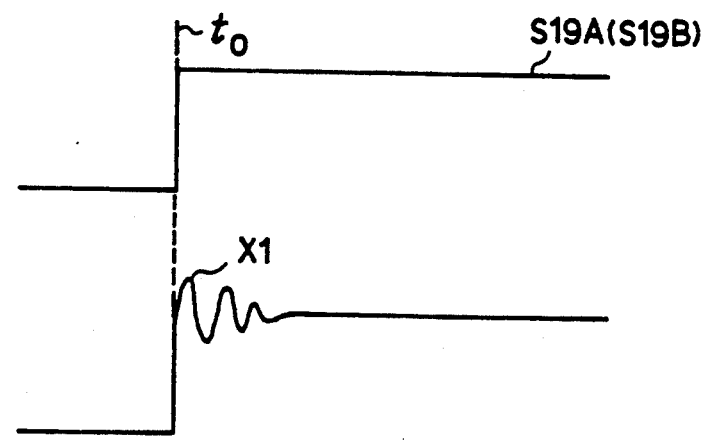
FIG. 10A
FIG. 10B

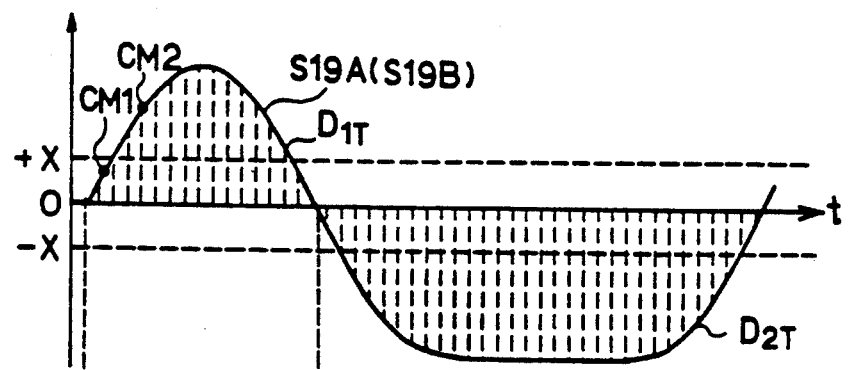
FIG.12A
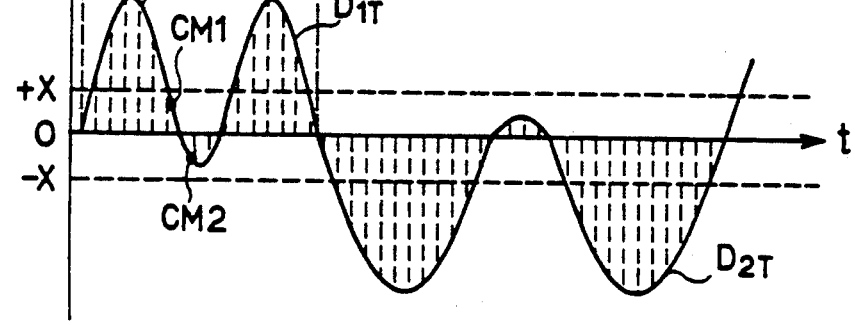
FIG.12B
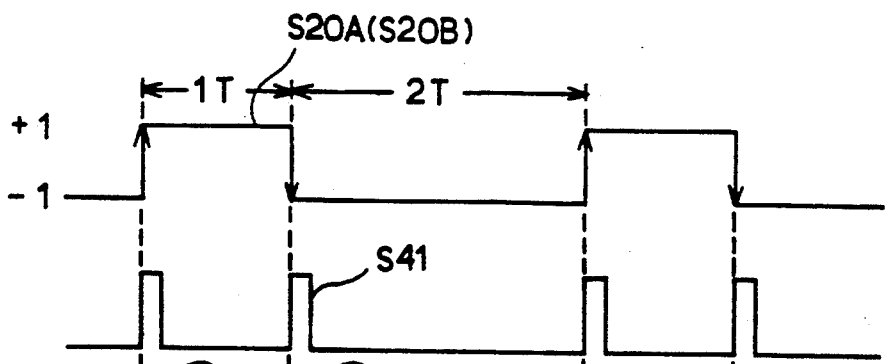
FIG.13A
FIG.13B
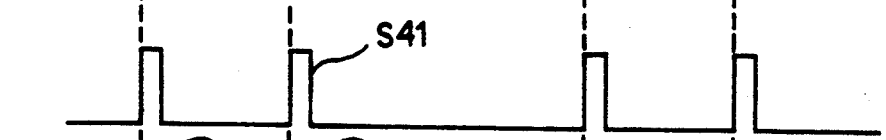
FIG.13C
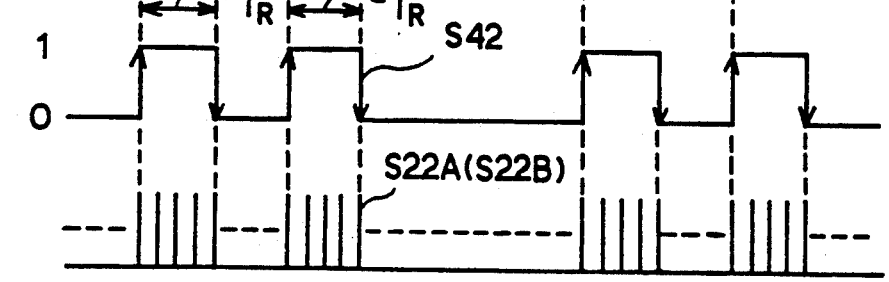
FIG.13D

| | CURRENT VALUE | | | | | | | |
|---|---|---|---|---|---|---|---|---|
| | | -7 | -5 | -3 | -1 | +1 | +3 | +5 | +7 |
| PREVIOUS VALUE | -15 | -15 | -15 | -15 | -15 | -15 | -13 | -11 | -9 |
| | -13 | -7 | -15 | -15 | -15 | -15 | -13 | -11 | -9 |
| | -11 | -7 | -5 | -15 | -15 | -15 | -13 | -11 | -9 |
| | -9 | -7 | -5 | -3 | -15 | -15 | -13 | -11 | -9 |
| | -7 | -7 | -5 | -3 | -1 | -15 | -13 | -11 | -9 |
| | -5 | -7 | -5 | -3 | -1 | +1 | -13 | -11 | -9 |
| | -3 | -7 | -5 | -3 | -1 | +1 | +3 | -11 | -9 |
| | -1 | -7 | -5 | -3 | -1 | +1 | +3 | +5 | -9 |
| | +1 | +9 | -5 | -3 | -1 | +1 | +3 | +5 | +7 |
| | +3 | +9 | +11 | -3 | -1 | +1 | +3 | +5 | +7 |
| | +5 | +9 | +11 | +13 | -1 | +1 | +3 | +5 | +7 |
| | +7 | +9 | +11 | +13 | +15 | +1 | +3 | +5 | +7 |
| | +9 | +9 | +11 | +13 | +15 | +15 | +3 | +5 | +7 |
| | +11 | +9 | +11 | +13 | +15 | +15 | +15 | +5 | +7 |
| | +13 | +9 | +11 | +13 | +15 | +15 | +15 | +15 | +7 |
| | +15 | +9 | +11 | +13 | +15 | +15 | +15 | +15 | +15 |

DATA TRANSFER SYSTEM

BACKGROUND OF THE INVENTION

This invention relates to a portable device having information within a identification card (ID card) etc. and an outside reading device, more particularly to transference of information among those correctly.

As an information card reader for reading an information data from an information card consisting of an ID card, there proposed hitherto is such a one as shown in the U.S. application Ser. No. 294,051 (filed on Jan. 6, 1989). This information card reader is a construction of an information card reading system wherein, as shown in FIG. 1, an answer request signal W1 with, for example, 2.45 [G Hz] microwave as a carrier wave is generated in an answer request signal generation circuit 2 of an information reader 1 and is sent to an information card 4 through a sending antenna 3, an answer information signal W2 sent back from the information card 4 is loaded in an answer signal processing circuit 6 through a receiving antenna 5 of the information reader 1, thereby checking gate-passers bearing the information card 4 as an identification card or freight with the information card 4 stuck thereon as a tag.

Proposed hitherto as the information card 4 applicable to such information card reading system, is that in which a dipole antenna 4B stuck on a substrate 4A so as to form a part of wiring pattern, an information signal generation circuit 4C in a configuration of integrated circuit (IC) for forming an information signal and a power battery 4D are connected by a wiring pattern 4E, an impedance at a feeding point of the dipole antenna 4B is adjusted according to the information signal generated in the information signal generation circuit 4C, and thus a reflection factor to a carrier wave discharged from the information reader 1 as the answer request signal W1 is modified, thereby sending back the reflected wave as the answer information signal W2.

The information generation circuit 4C has an electrical circuit configuration shown in FIG. 2, operating such that an information data S1 loaded in an information memory 11 constructed, for example, of P-ROM with an ID code put before-hand is read by an address signal S3 of an address counter 13 operating according to a clock signal S2 of a clock oscillation circuit 12, and is fed to an impedance variable circuit 14 consisting, for example, of a field effect transistor.

The impedance variable circuit 14 is connected between a pair of feeding point terminals T1 and T2 of the dipole antenna 4B, and thus when the information data S1 becomes a logic "1" or a logic "0" the field effect transistor comes to ON/OFF operation, the impedance at the feeding point of the dipole antenna 4B connected to the feeding point terminals T1 and T2 is subjected to a variable control, thus controlling a reflection factor to the answer request signal W1 incident on the dipole antenna 4B.

The power battery 4D is connected between the feeding point terminal T1 of the information signal generation circuit 4C on a ground side and a power terminal T3, which is ready for controlling an impedance at the feeding point of the dipole antenna 4B continuously at all times according to the information data S1.

An intrinsic ID code is assigned to the information card 4 in the information memory 11, thus the information reader 1 reading an information data incorporated in the information card 4 upon identifying the ID code.

Meanwhile, a signal level of the answer information signal W2 arriving at the receiving antenna 5 from the information card 4 constructed as above is faint substantially, and further a data transmission rate and phase of the answer information signal W2 fluctuate according to an operating state of the information card 4.

By the way, the data transmission rate of the answer information signal W2 is determined on an oscillation frequency in the clock oscillation circuit 12 of the information signal generation circuit 4C, and the oscillation frequency fluctuates inevitably to a great extent (3 times to 10 times for example) according to a change in ambient temperature of the information card 4 in addition to a dispersion caused at the time of IC production or according to a dispersion of power battery at all information cards 4.

Particularly, there is a tendency toward using that simple of a construction and small size as the clock oscillation circuit 12 mountable of the information card 4 so as to cope with a miniaturization of the information card 4, and thus a circuit of CR oscillator construction susceptible to ambient temperature practically is applied thereto, therefore a fluctuation in oscillation frequency is quite unavoidable.

In addition thereto, an external noise of signal level exceedingly high as compared with the signal level of the answer information signal W2 arrives at the receiving antenna 5. The external noise includes, for example, that of the answer request signal W1 sent from the sending antenna 3 which arrives directly at the receiving antenna 5, that of the answer request signal W1 having arrived at the receiving antenna 5 through reflection on wall and others present around the information card 4, that of having arrived from a noise source such as fluorescent lamp or the like, that of the answer request signal W1 sent from other information reader 1 when the information reader 1 is provided more than one, that of being generated as a beat component of the answer request signal W1 from the other information reader 1 and the self answer request signal W1 and others, and the signal level of these noise components becomes so high inevitably as compared with the answer request signal W2 obtainable practically as a reflected wave from the information card 4.

In the information card 4 under such severe noise conditions hitherto, where an information data stored in the information memory 11 is sent, such technique as will send it at a time is employed (Japanese Patent Application Laid Open No. 2-93845, for example).

However, if there arises a phenomenon wherein a carrier wave signal is interrupted practically while the information data is transmitted, then there may be a disadvantage such that an effective information data cannot be present until a first data of the information data is started for transmission again after a transmission of the ensuing information data is kept going to the end.

SUMMARY OF THE INVENTION

In view of the foregoing, an object of this invention is to provide a portable device which transmits other remaining data as effective information data irrespective of such state where a part of the information data loaded in the portable device cannot be transmitted.

Another object of this invention is to provide a data transfer system in which the information data transmitted from the portable device returned to a normal state irrespective of such state where a part of information data loaded in the portable device cannot be transmitted.

A further object of this invention is to provide an information reader capable of reading securely an information data carried by a faint answer information signal under severe noise conditions.

The foregoing objects and other objects of the invention have been achieved by the provision of a data transfer system which comprises at least one portable device and at least one outside reading device whereby information is transmitted from the portable device to the outside reading device; the portable device comprising: first memory means for storing the information which comprises a plurality of data blocks, each of the data blocks comprising at least an information data, a block identification data and an error check data; transmitting means for transmitting the information to the outside reading device wherein each of the data blocks is a unit of data transmission: and the outside reading device comprising: receiving means for receiving the data blocks transmitted by the portable device; error checking means for error checking and/or correcting the data blocks with the error check data; second memory means for storing the data blocks when the data blocks are obtained with no error; and data processing means for reading the data blocks from the second memory means after all of the data blocks of a portable device are stored in the second memory means and for processing the data blocks read.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A, 6B and 6C are signal waveform diagram representing an information data demodulating operation of an answer signal processing circuit 6 of FIG. 3;

FIG. 7 is a characteristic curve representing frequency characteristics of digital band-pass filters 41A and 41B of FIG. 3;

FIG. 8 is a connection diagram representing a configuration of the digital band-pass filters 41A and 41B of FIG. 3;

FIG. 9 is a characteristic curve serving for illustration of the scanning operation;

FIGS. 10A, and 10B are signal waveform diagram serving for illustration of an effect in preventing the ringing wave generation;

FIGS. 12A and 12B are signal waveform diagram serving for illustration of an operation of zero crossing detection circuits 42A and 42B of FIG. 11;

FIGS. 13A 13B, 13C and 13D are signal waveform diagram serving for illustration of a phase detecting operation in a counting circuit 75 of FIG. 11;

FIG. 14 is a chart showing a conversion value table of a phase error conversion circuit of FIG. 11;

FIG. 21 is a chart showing a configuration of data memory; and

DETAILED DESCRIPTION OF THE INVENTION

Prefered embodiments of this invention will be described with reference to the accompanying drawings.

(1) General Construction of Information Reader

Figure 1:
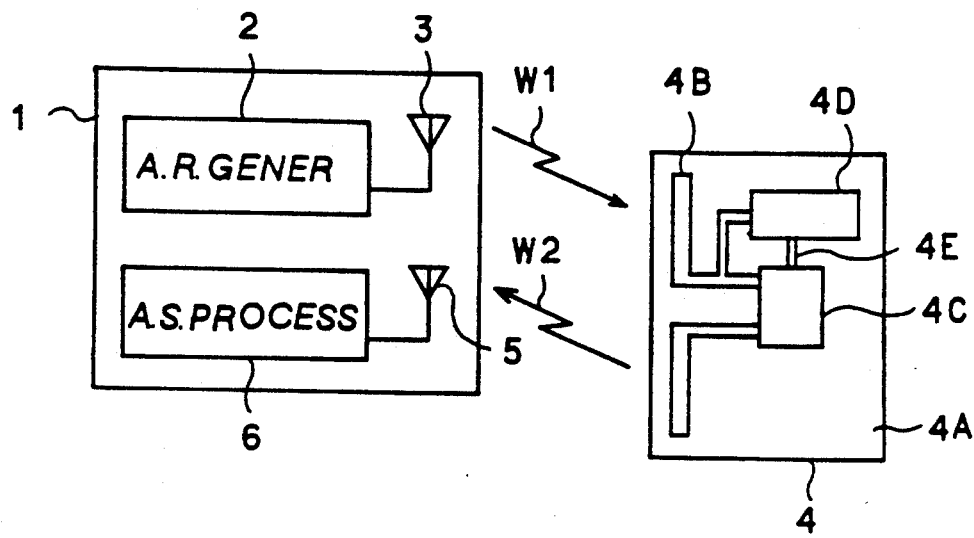
FIG. 1 is a block diagram showing an information card reading system.
Figure 3A:
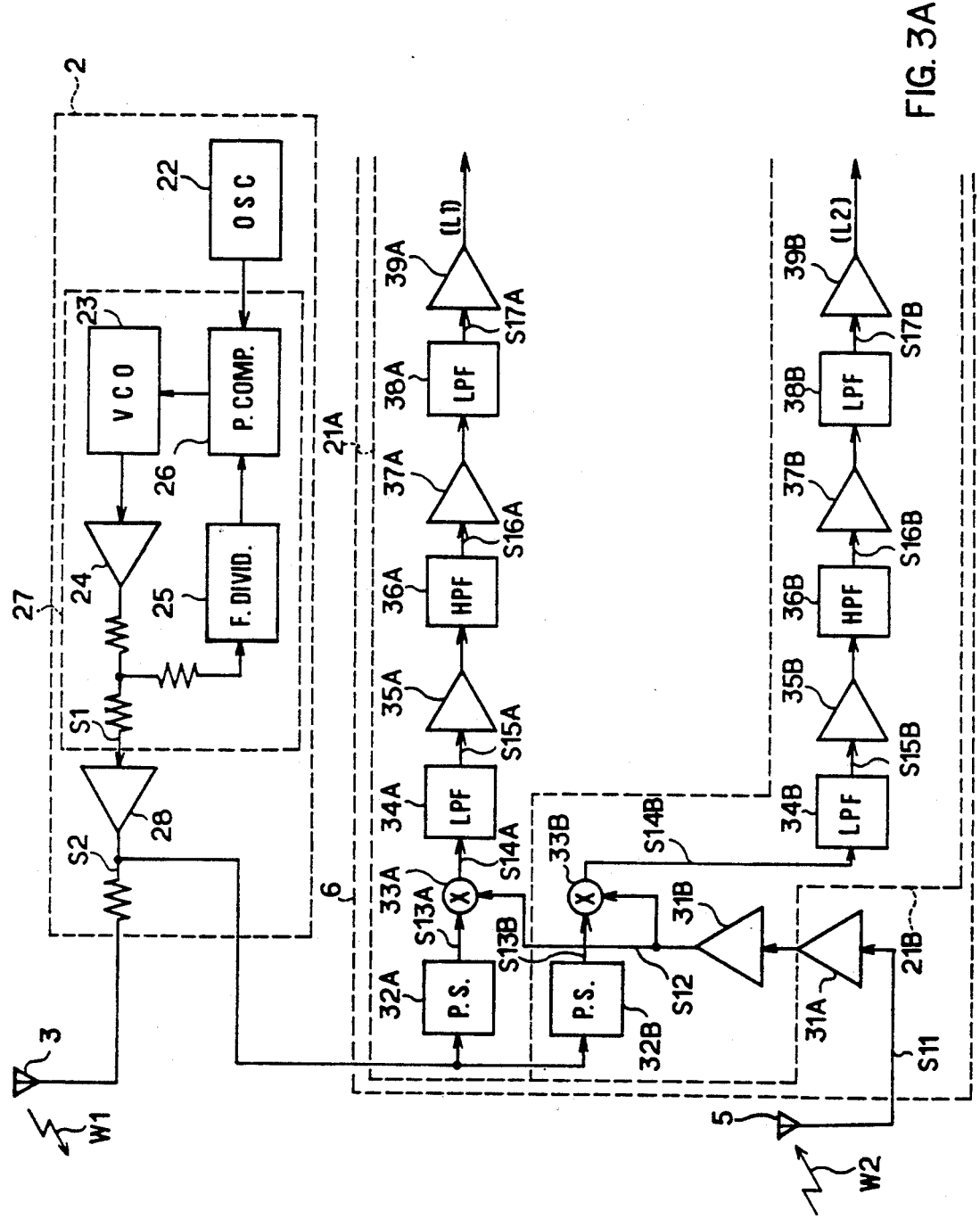
FIGS. 3A and 3B is a block diagram representing an information reader given in one embodiment of this invention.
Figure 3B:
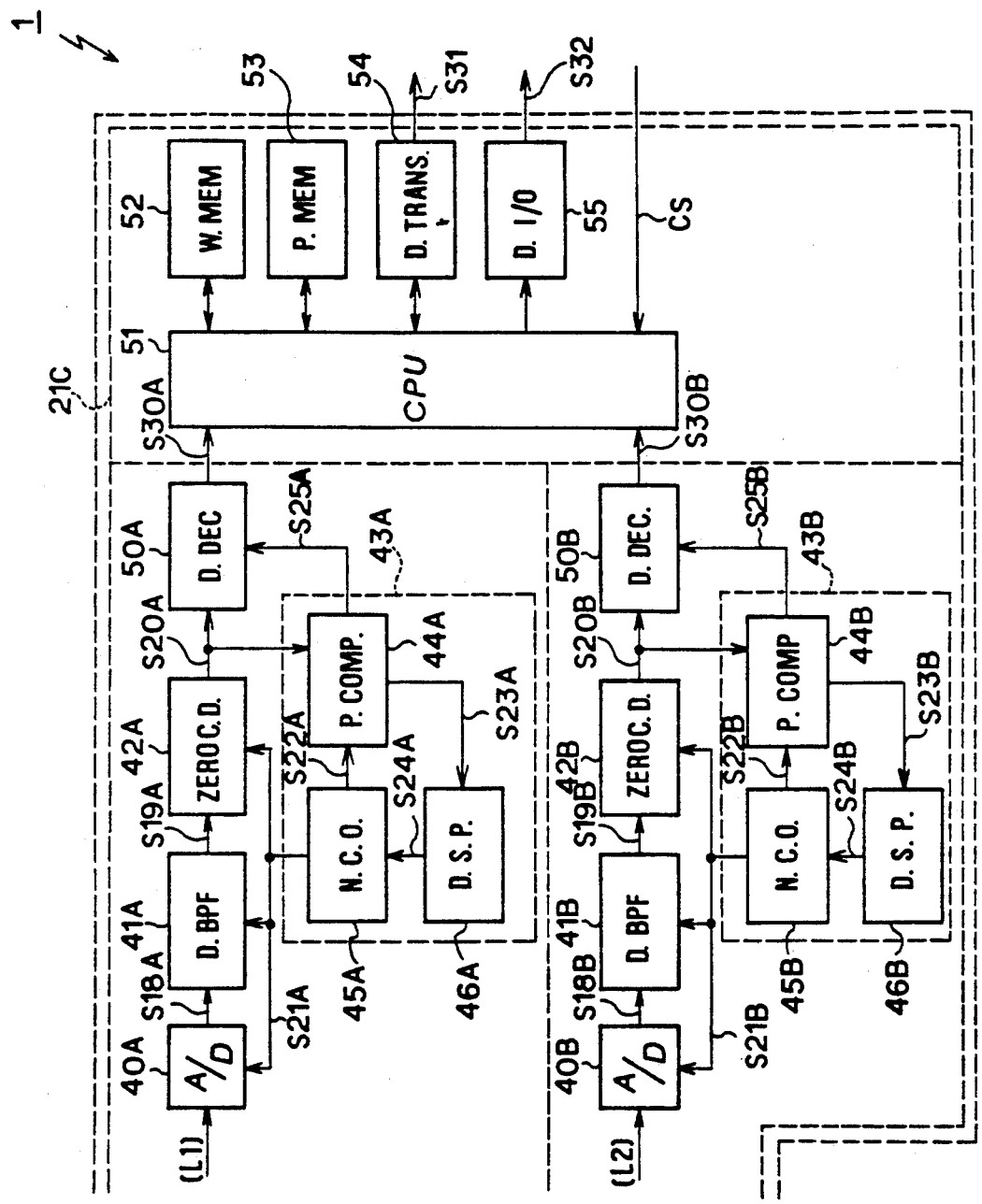

In FIG. 3 where like reference characters represent like parts given in FIG. 1, the information reader 1 comprises processing the answer information signal W2 sent back according to the answer request signal W1 generated in the answer request signal generation circuit 2 in the answer signal processing circuit 6 having a first and a second sequence answer signal loading circuits 21A and 21B.

In the case of this embodiment, the answer request signal generation circuit 2 generates a carrier wave signal S1 in a phase locked loop (PLL) type carrier wave signal generation circuit 27 comprising a voltage control type oscillation circuit 23, an amplifier circuit 24, a frequency divider circuit 25 and a phase comparator circuit 26 according to an oscillation output of a crystal oscillator circuit 22, amplifies it in a transmitting amplifier circuit 28, and sends the amplification output S2 from the sending antenna 3 as the answer request signal W1.

Figure 2:
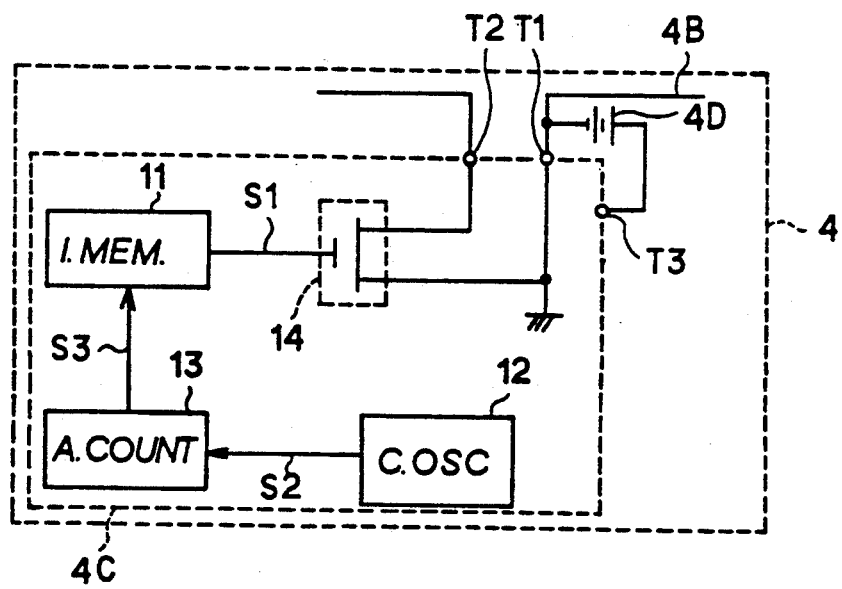
FIG. 2 is a block diagram showing a configuration of a prior art information card.
Figure 4:
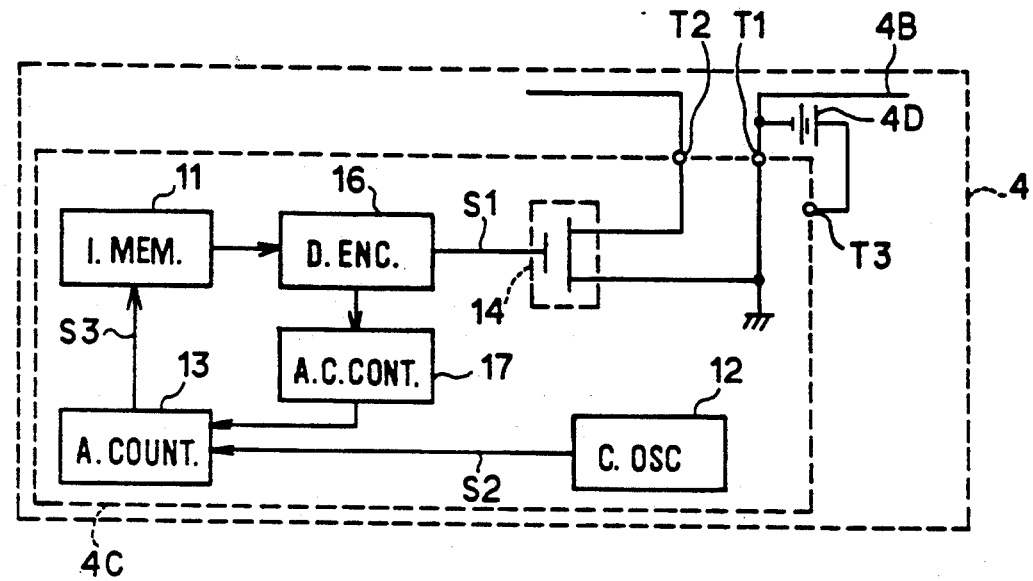
FIG. 4 is a block diagram representing a construction of information card.
Figure 5:
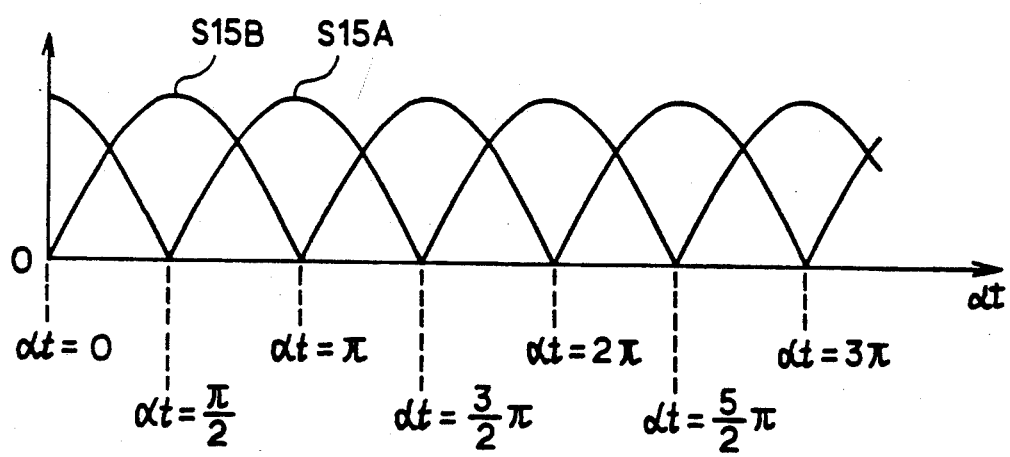
FIG. 5 is a signal waveform diagram representing filter outputs of low-pass filters 34A and 34B of FIG. 1.

As shown in FIG. 4 with like reference characters given to like parts of FIG. 2, in the information card 4 of this embodiment, a transmission information data of the information memory 11 is added with a predetermined control information in a data encode circuit 16, subjected to a biphase modulation, and is then fed to the impedance variable circuit 14 as the information data signal S1.

Thus, the data encode circuit 16 forms a logic "1" data from rising, for example, to a high signal level during the period of time 1T, forms a logic "0" data from falling to a low signal level during the period of time 2T, and sends them as the information data signal S6.

When adding the control information, the data encode circuit 16 stops the address counter 13 operating for address counting through an address counter control circuit 17.

The answer signal processing circuit 6 receives the answer information signal W2 sent back from the information card 4 through the receiving antenna 5, and feeds a receiving signal S11 to mixer circuits 33A and 33B within the first and the second sequence answer signal loading circuits 21A and 21B through receiving amplifier circuits 31A, 31B.

The mixer circuits 33A and 33B are given phase shift outputs S13A and S13B obtainable from shifting phases of the amplification output S2 of the answer request signal generation circuit 2 by a predetermined shift amount in phase shift circuits 32A and 32B respectively, and the mixer circuits 33A and 33B obtain mix outputs S14A and S14B from multiplying the phase shift outputs S13A and S13B by a receiving amplification signal S12 respectively.

Here, while the phase shift circuit 32A sends a signal of reference phase having a carrier wave angular frequency $\omega$ of the answer request signal W1 as the phase shift output S13A:

$$S13A = K_{1A} \sin \omega t \quad (1)$$

the phase shift circuit 32B sends the phase shift output S13B with the phase shifted 90° against the phase shift output S13A, as:

$$S13B = K_{1B} \cos \omega t \quad (2)$$

Then, as given in the following equation:

$$S12 = K_2 \sin(\omega + \alpha)t \quad (3)$$

the receiving amplification signal S12 can be expressed as a signal with the phase deflected by a phase shift angular frequency $\alpha$ corresponding to a distance between the information reader 1 and the information card 4 against the carrier wave angular frequency $\omega$.

The mixer circuits 33A and 33B comprise each a multiplier circuit for multiplying the receiving amplification signal S12 expressed by Eq. (3) by the phase shift outputs S13A and S13B expressed by Eqs. (1) and (2) respectively, thereby obtaining, from the mixer circuits 33A and 33B, mix outputs S14A and S14B consisting of a signal component of the phase shift amount $\alpha$ and a signal component having an angular frequency $2\omega$ double of the carrier wave angular frequency $\omega$, as:

$$\begin{aligned} S14A &= S13A \cdot N \cdot S12 \\ &= K_{1A} \sin\omega t \cdot N \cdot K_2 \sin(\omega + \alpha)t \\ &= \frac{K_{1A}K_2}{2}\{\cos\alpha t - \cos(2\omega + \alpha)t\} \end{aligned} \quad (4)$$

$$\begin{aligned} S14B &= S13B \cdot N \cdot S12 \\ &= K_{1B}\cos\omega t \cdot N \cdot K_2 \sin(\omega + \alpha)t \\ &= \frac{K_{1B}K_2}{2}\{\sin\alpha t + \sin(2\omega + \alpha)t\} \end{aligned} \quad (5)$$

The mix outputs S14A and S14B are provided to low-pass filters 34A and 34B to have the signal component of the carrier wave angular frequency $2\omega$ removed, and thus filter outputs S15A and S15B expressed as:

$$S15A = \frac{K_{1A}K_2}{2} \cos\alpha t \quad (6)$$

$$S15B = \frac{K_{1B}K_2}{2} \sin\alpha t \quad (7)$$

are fed to high-pass filters 36A and 36B described below through amplifier circuits 35A and 35B.

In regard to signal levels of the filter outputs S15A and S15B expressed by Eqs. (6) and (7) respectively, as shown in FIG. 3, according to the phase $\alpha t$ changes with the lapse of time t, while the filter output S15A becomes zero (the signal level being at a point "0" called "null point") when the phase $\alpha t$ changes as $\alpha t = \pi/2, 3\pi/2, 5\pi/2, \ldots$, it is maximized in value when the phase $\alpha t$ changes as $\alpha t = 0, \pi, 2\pi \ldots$.

On the other hand, in the case of filter output S15B, while the signal level becomes maximized when the filter output S15A comes to the null point phase, that is, $\alpha t = \pi/2, 3\pi/2, 5\pi/2, \ldots$, it changes to the null point at the phase where the filter output S15A is maximized in value, that is, $\alpha t = 0, \pi, 2\pi, \ldots$.

Since the filter outputs S15A and S15B present a complementary change as described, from selecting the filter output S15A or S15B whichever is larger in signal level, it can be loaded into the answer signal processing circuit 6 as an effective receiving signal in the state where the answer request signal W2 does not come to a low signal level at the null point or thereabouts at all points in time.

The high-pass filters 36A and 36B remove disturbance noises of DC to several [k Hz] included in the filter outputs S15A and S15B.

In this connection, the disturbance noise in direct current component arises practically when the answer request signal W1 sent from the sending antenna 3 of the information reader 1 is reflected by a still matter (wall for example) and then arrives at the receiving antenna 5. Further such disturbance noises of DC to several [k Hz] arises when the information card 4 is moved.

Thus the disturbance noises arising in these low frequency domains is removed from filter outputs S16A and S16B of the high-pass filters 36A and 36B, and such filter outputs are fed to low-pass filters 38A and 38B through amplifier circuits 37A and 37B.

When an analog-to-digital conversion process is carried out in the analog/digital converter circuits 40A and 40B on the rear stage according to a sampling frequency $f_S$, the low-pass filters 38A and 38B remove a frequency component coming over Nyquist frequency so as not to produce any aliasing noises, thus as shown in FIG. 6(A) a carrier frequency component can be removed from the filter outputs S16A and S16B to detect information data signal components S17A and S17B shown in FIG. 6(B).

The analog/digital converter circuits 40A and 40B convert the information data signal components S17A and S17B amplified in amplifier circuits 39A and 39B into 8-bit digital data S18A and S18B, pass them through the digital band-pass filter 41A and 41B having a frequency characteristic of the pass band J as shown in FIG. 7, thereby obtaining the filter outputs S19A and S19B comprising extracting 2T term data $D_{2T}$ and 1T term data $D_{1T}$ from the information data signal components S17A and S17B, and the filter outputs S19A and S19B are fed to zero crossing detection circuits 42A and 42B.

Thus, the zero crossing detection circuits 42A and 42B send information data signals S20A and S20B consisting of an information data DT transisting to a level "+1" or "−1" in the timing whereat the 2T and 1T term data $D_{2T}$ and $D_{1T}$ included in the information data signal components S17A and S17B cross a zero point as shown in FIG. 6(C).

Here, a point in sampling time of the analog/digital converter circuits 40A and 40B, an operating clock of the digital band-pass filters 41A and 41B, and a point in time of zero crossing detection of the zero crossing detection circuits 42A and 42B are controlled by PLL output pulses S21A and S21B obtainable through the PLL circuit parts 43A and 43B, thus even if frequencies of the information data signal components S17A and S17B fluctuate according to data transmission rate conditions of the information card 4, an arrangement is such that the PLL circuit parts 43A and 43B are ready for PLL operation to follow such fluctuation of the frequencies.

The PLL circuit parts 43A and 43B compare information data signals 20A and 20B of the zero crossing detection circuits 42A and 42B with a phase comparison signal S22A and S22B obtainable in numerical controlling oscillation circuits 45A and 45B through phase comparator circuits 44A and 44B, convert phase error signals S23A and S23B into feedback data S24A and S24B through digital signal processing circuits 46A and 46B, and control oscillation frequencies of the numerical controlling oscillation circuits 45A and 45B so that the phase error signals S23A and S23B will be "0".

Thus, the numerical controlling oscillation circuits 45A and 45B are controlled to a state oscillating on such frequency as will follow phase of phase comparison signals S22A and S22B to the information data signals S20A and S20B, send oscillation outputs as the PLL output pulses S21A and S21B, and feed as data sampling clock signals S25A and S25B to data code circuits 50A and 50B through the phase comparator circuits 44A and 44B.

The data decoder circuits 50A and 50B comprise interpreting data formed in the information card 4, read header data put to a transmitted data, demodulate the information data subjected to a diphase modulation, and decide a presence of transmission error according to an error detection code (or CRC code (cyclic redundancy check code) in this case).

Decode outputs S30A and S30B of the data code circuits 50A and 50B are fed to a central processing unit (CPU) 51 constituting a part of a data processing part 21C, the CPU 51 processes data of the decode outputs S30A and S30B thus fed according to programs loaded in a program memory 53 of ROM (read only memory) construction as utilizing a working memory 52 of RAM (random access memory) construction where necessary, send them as a transmission data S31 through a data transfer circuit 54, and also send as a display data S32 through a display input/output circuit 55.

In the configuration of FIG. 3, when the faint answer information signal W2 is sent back to the state where the answer request signal W1 is sent according to the carrier wave signal S1 generated in the carrier wave generation circuit 27, it is converted into the mix outputs S14A and S14B with the phases shifted 90° to each other in the phase shift circuit 34A, the mixing circuit 33A of the first sequence answer signal loading circuit 21A and the phase shift circuit 34B, the mixing circuit 33B of the second sequence answer signal loading circuits 21B, and then the next process ensues.

Thus, even if a distance between the information card 4 and the information reader 1 holds a value coming exactly at the null point or thereabouts, the receiving signal of a practically sufficient signal processing level can be loaded at all times from either one of the first sequence answer signal loading circuit 21A or the second sequence answer signal loading circuit 21B by utilizing a difference in phase between the mix outputs S14A and S14B, and as a result, the answer information signal W2 can be received stably.

Thus in this embodiment, firstly, according to the configuration of the analog/digital converter circuit 40A, the digital band-pass filter 41A, the zero crossing detection circuit 42A, the PLL circuit part 43A, and the analog/digital converter circuit 40B, the digital band-pass filter 41B, the zero crossing detection circuit 42B, the PLL circuit part 43B, the PLL circuit part 43A can be locked to a frequency of the information data in a short period of time through a simple construction by utilizing a floating state of the oscillation frequency obtainable at the time of self-running.

Further secondly, in this embodiment, since the PLL circuit parts 43A and 43B operate for high-speed locking, a PLL following operation uses a further high-speed construction.

Then thirdly, in this embodiment, in consideration of the data transmission rate fluctuating sharply in the information card 4, the construction is such that the transmission data is transmitted through blocking so as to avoid effectively the influence to be exerted thereon.

Fourthly, still further, in this embodiment, the CPU 51 carries out a process for synthesizing a clock data securely.

These characteristic constructions will further be described in detail as below.

(2) Leading PLL Circuit into Information Data Signal Component

As described hereinbefore, the information card as shown in FIG. 4 has been miniaturized and simplified as a whole by applying that of CR oscillator construction as the clock oscillation circuit 12, however, the clock oscillation circuit 12 of CR oscillator construction is capable practically of fluctuating in oscillation frequency 10 times or so maximumly according to a change in ambient temperature, which is indicative of a possibility that frequencies of the 1T term data $D_{1T}$ and the 2T term data $D_{2T}$ included in the information data signal components S17A and S17B obtained from the low-pass filters 38A and 38B as shown in FIG. 3, that is, the information data signal components sent from the information card 4 may fluctuate 10 times or so.

Thus when the information data signal components S17A and S17B having a specific one frequency out of a frequency range of such 10-time fluctuation width are obtained from the low-pass filters 38A and 38B, the information data signal components S17A and S17B are converted into 8-bit series digital data by a sampling frequency determined on the PLL output pulses S21A and S21B in the analog/digital converter circuits 40A and 40B, and then the digital conversion outputs S18A and S18B are filtered by the pass band J of the digital band-pass filters 42A and 42B having the frequency characteristic shown in FIG. 7, thus having the 1T term data $D_{1T}$ and the 2T term data $D_{2T}$ extracted.

The digital band-pass filters 41A and 41B are constructed of a finite impulse response (FIR) circuit of non-cyclic configuration, and the digital conversion outputs S18A and S18B are fed to first stage to eighth stage delay circuits 61A to 61H connected longitudinally as shown in FIG. 6.

The first stage to the eighth stage delay circuits 61A to 61H comprise a flip-flop each, shifting the digital conversion outputs S18A and S18B as delaying each bit by one clock period with the PLL output pulse S21A sent from the PLL circuit part 43A as a clock pulse.

Delay outputs of the first stage and the eighth stage delay circuits 61A and 61H are added in an addition circuit 62A, weighted by a weighting signal $W_A$ in a multiplication circuit 63A, given then to an addition circuit 64, and likewise, delay outputs of the second stage and the seventh stage delay circuits 61B and 61G, the third stage and the sixth stage delay circuits 61C and 61F, the fourth stage and the fifth stage delay circuits 61D and 61E are added in addition circuits 62B, 62C, 62D respectively, weighted by weighting signals $W_B$, $W_C$, $W_D$ in multiplication circuits 63B, 63C, 63D and then given to the addition circuit 64.

Thus, as shown in FIG. 9, the filter outputs S19A and S19B having such pass band J as is capable of selecting the 1T and the 2T term data $D_{1T}$ and $D_{2T}$ at high selectivity are obtainable on an output end of the addition circuit 64.

In the configuration of FIG. 8, the digital band-pass filters 41A and 41B are capable of setting the pass band J as shown in FIG. 9 at a position determined on frequencies of the PLL pulses S21A and S21B, and hence where the pass band J comes to coincide with the 1T and the 2T term data $D_{1T}$ and $D_{2T}$, the 1T and the 2T term data $D_{1T}$ and $D_{2T}$ can be extracted and sent to the zero crossing detection circuits 42A and 42B as shown in FIG. 3 as the filter outputs S19A and S19B, thereby keeping a locked state of the PLL circuit parts 43A and 43B.

Practically, however, the data transmission rate of the information card 4 disperses sharply as 10 times or so in accordance with a fluctuation in oscillation frequency of the clock oscillation circuit 12 in FIG. 4, therefore at the beginning when the answer information signal W2 is sent back from the new information card 4, the pass band J is not necessarily present at the frequency position of the 1T and the 2T term data $D_{1T}$ and $D_{2T}$ as indicated by a full line in FIG. 9.

In such state the PLL circuit part 43A cannot be locked to the 1T and the 2T term data $D_{1T}$ and $D_{2T}$ of the information card 4 in communication currently, and thus actuates the numerical controlling oscillation circuits 45A and 45B for self-oscillation.

However, in such state, if a noise component cannot be removed practically through the low-pass filters 38A and 38B and thus is mixed in the information signal components S17A and S17B, then the noise component will be fed into the zero crossing detection circuits 42A and 42B by way of the pass band J of the digital band-pass filters 41A and 41B, and accordingly into the PLL circuit parts 43A and 43B, and hence the PLL circuit parts 43A and 43B operate for locking falsely to the noise component. However, since the noise component cannot always be received steadily, the PLL circuit parts 43A and 43B become afloat to get the pass band J unsteady covering a full range wherein the 1T and the 2T term data $D_{1T}$ and $D_{2T}$ disperse.

As a result when the PLL circuit parts 43A and 43B are ready for self-oscillation, since frequencies of the PLL output pulses 21A and 21B become unsteady, substantially the pass band J passes a frequency position of the 1T and the 2T term data $D_{1T}$ and $D_{2T}$ of the information card 4 currently in communication as indicated by a broken line in FIG. 9, and comes to a scanning operation for leading them into the PLL circuit parts 43A and 43B, thus causing the PLL circuit parts 43A and 43B to be locked to the 1T and the 2T term data $D_{1T}$ and $D_{2T}$.

The above state is maintained as long as the answer information signal W2 arrives from the information card 4 currently in communication, and thus even if the frequency position of the 1T and the 2T term data $D_{1T}$ and $D_{2T}$ of the information card 4 disperses sharply, it can securely be searched and fed into the CPU 51 through the data code circuits 50A and 50B.

Now, therefore, according to the configuration of FIG. 6, since eight stages of the delay circuits 61A to 61H are provided correspondingly to the analog/digital converter circuits 40A and 40B converting the information data signal components S17A and S17B into 8-bit series data, when signal levels of the filter outputs S19A and S19B transmit according to a change of the bit data as shown in FIG. 10(A), a ringing can be kept from arising.

In this connection, where the band-pass filter is constructed of FIR of a non-cyclic circuit configuration, from increasing the number of stages of the delay circuits connected longitudinally, a ringing waveform X1 shown in FIG. 10(B) may arise inevitably during the period of sampling time corresponding to the increased stage number, however, a configuration given in FIG. 8 is effective in keeping the ringing waveform X1 from arising.

(3) Construction of PLL Circuit Part

The PLL circuit parts 43A and 43B in FIG. 3 are constructed to be ready for locking motion at high speed to a frequency of the information data signal with a heavy dispersion of the frequency according to the zero crossing detection signals S20A and S20B of the zero crossing detection circuits 42A and 42B.

Figure 11:
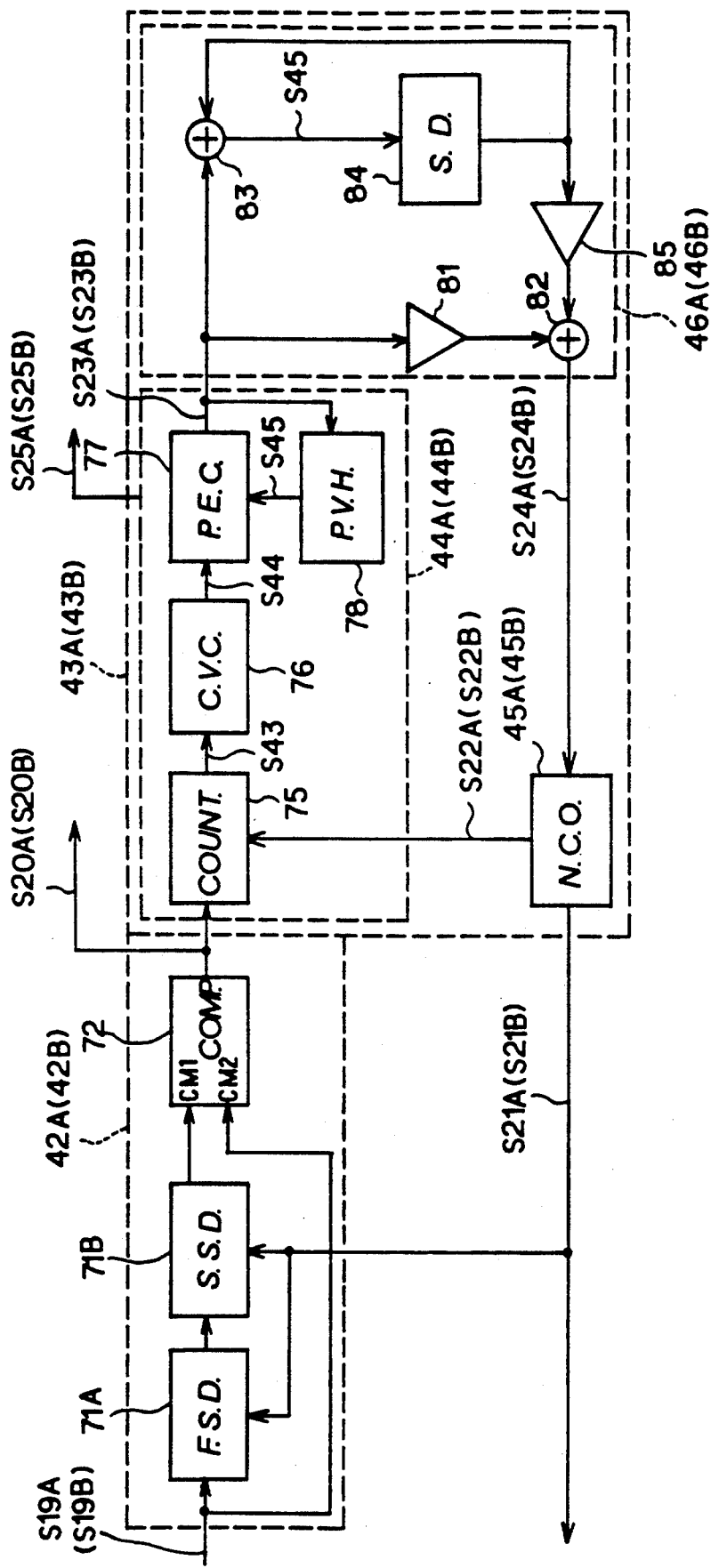
FIG. 11 is a block diagram representing a detailed configuration of PLL circuit parts 43A and 43B of FIG. 3.

As shown in FIG. 11, the zero crossing detection circuits 42A and 42B have a construction wherein the filter outputs S19A and S19B are received to a 2-clock period delay through first stage and second stage delay circuits 71A and 71B operating according to the PLL output pulses S21A and S21B, input to a comparator circuit 72 as a first comparison input CM1, and the filter outputs S19A and S19B are input directly to the comparator circuit 72 as a second comparison input CM2.

When the first comparison input CM1 is positive and the second comparison input CM2 is higher than a positive reference value "+X", as:

$$CM1>0 \text{ and } CM2> +X \rightarrow +1 \qquad (8)$$

the comparator circuit 72 sends the information data signals S20A and S20B of a positive value "+1", and also when the first comparison input CM1 is negative and the second comparison input CM2 is lower than a negative reference value "−X", as:

$$CM1<0 \text{ and } CM2< -X \rightarrow -1 \qquad (9)$$

it sends the information data signals S20A and S20B of a numerical value "−1".

In addition thereto, when the first and the second comparison inputs CM1 and CM2 having input conditions other than those of Eqs. (8) and (9) arrive, the comparator circuit 72 neglects them and keeps sending previous values as the information data signals S20A and S20B.

In case a sufficiently large tertiary harmonic component is contained in the filter outputs S19A and S19B provided to the zero crossing detection circuits 42A and 42B, as shown in FIG. 12(B), if the information data signals S20A and S20B are generated under the conditions of Eqs. (8) and (9), the filter outputs S19A and S19B are influenced thereby and capable of crossing a zero point, and if so, then a blind zone will be provided within the signal levels "−X" to "+X" in the comparator circuit 72, thereby preventing the incorrect zero crossing from being detected.

Then, in case the tertiary harmonic component is not contained therein, which is ideal as shown in FIG. 12(A), the first comparison input CM1 representing a signal level of the filter outputs S19A and S19B two sample periods prior to the second comparison input CM2 representing a signal level of the present filter outputs S10A and S10B is obtained in a state satisfying Eqs. (8) and (9) if the filter outputs S19A and S19B cross the zero crossing point from a negative signal level to a positive signal level, or from a positive signal level to a negative signal level, thereby obtaining the information data signals S20A and S20B transiting to the signal level "+1" or "−1" at the timing when the second comparison input CM2 exceeds the positive reference value "+X" or the negative reference value "−X".

On the other hand, if the first and the second comparison inputs CM1 and CM2 are subjected to an influence of a tertiary harmonic component to cross the zero level as shown in FIG. 12(B), then the zero crossing point cannot satisfy Eq. (8) or (9) and thus the signal level of the information data signals S20A and S20B can be made not to transmit at the timing of the second comparison input CM2.

Thus, as described with reference to FIG. 8, when the digital band-pass filters 41A and 41B of 8-stage delay circuit configuration are applied, a tertiary harmonic component $D_{3X}$ is capable of being not removed full practically as shown in FIG. 7, and thus when the tertiary harmonic component $D_{3X}$ passes through the digital band-pass filters 41A and 41B, the zero crossing detection circuits 42A and 42B are capable of detecting it erroneously, however, this may effectively be avoided by using the zero crossing detection circuits 42A and 42B constructed as shown in FIG. 11.

The information data signals S20A and S20B obtained thus through the zero crossing detection circuits 42A and 42B have waveforms as shown in FIG. 13(A), the signals are provided to a counting circuit 75 of the phase comparator circuits 44A and 44B as a counting control signal.

The counting circuit 75 generates a detection pulse S41 as shown in FIG. 13(B) according to a rise and a fall of the information data signals S20A and S20B, a counter operation signal S42 rising to a logic "1" level for a predetermined period $T_R$ as shown in FIG. 13(C) is generated by the detection pulse S41, and a pulse number of a pulse train in FIG. 13(D) provided from the numerical controlling oscillation circuits 45A and 45B as the phase comparison signals S22A and S22B is beginning to count and is kept on counting for the period $T_R$ by the rise.

Here, the counting circuit 75 is ready for counting the pulses of the phase comparison signals S22A and S22B as many as 8, and when the pulses not less than 8 arrive, it returns to a zero count once and then restarts counting.

Thus, when the counting circuit 75 stops the counting operation from the counting operation signal S42 as shown in FIG. 13(C) falling to a logic "0" level, a counting signal S43 having values "0" to "7" is provided to a current value conversion circuit 76.

When numerical data "0" to "7" are provided as the counting signal S43, the current value conversion circuit 76 converts them into a current value conversion signal S44 through:

$$S44 = \{(S43-4)+0.5\} \times 2 \quad (10)$$

Thus, when the counting signal S43 holds the numeric values "0", "1", "2", "3", "4", "5", "6", "7", it is converted into the current value conversion signal S44 coming in "−7", "−5", "−3", "−1", "+1", "+3", "+5", "+7".

The current value conversion signal S44 is input to a phase error conversion circuit 77 constituting a conversion value table TABLE shown in FIG. 14.

The phase error conversion circuit 77 converts the current value conversion signal S44 with the numerical data "−7" to "+7" comprising a range of variation into the phase error signals S23A and S23B having a width of variation covering numerical data "−15" to "+15" according to how it changes, and selects a conversion number into the phase error signals S23A and S23B having an exceedingly extensive range of variation (that is, "−15" to "+15") with a range of variation of data obtained through a counting operation of the counting circuit 75, having a narrow range of counting and a previous value signal S45 provided from a previous value holding circuit 78 as conversion conditions.

In the phase comparator circuits 44A and 44B of such construction, if a value of the phase error signals S23A and S23B was "+1" in the previous phase comparison operation as shown in FIG. 13(A), then the value "+1" being held in the previous value holding circuit 78 is provided to the phase error conversion circuit 77 as the previous value signal S45 in a phase error detection operation this time.

In this case, a "+1" character position is assigned to the phase error conversion circuit 77 as the previous value in the conversion value table TABLE of FIG. 13, and if the current value becomes "−7", "−5", "−3", "−1", "+1", "+3", "+5", "+7", then the value of the phase error signals S23A and S23B is ready for taking "+9", "−5", "−3", "−1", "+1", "+3", "+5", "+7" accordingly thereto.

Accordingly, as a range for phase comparison operation in this case, when the counting signal S43 of the counting circuit 75 becomes "1", "2", . . . "7", the current value conversion circuit 76 converts into values "−5", "−3", . . . "+7" as the current value conversion signal S44, therefore the phase error conversion circuit 77 may send numeric values "−5", "−3", . . . "+7" as the phase error signals S23A and S23B.

In addition thereto, when a counting of the counting circuit 75 exceeds a maximum value "7" to return to a minimum "0", the current value conversion circuit 76 converts the counting signal S43 into the numeric value "−7" and provides to the phase error conversion circuit 77 as the current value conversion signal S44, thus the phase error conversion circuit 77 sending a numeric value "+9" as the phase error signals S23A and S23B.

Thus the phase comparator circuits 44A and 44B come to send the phase error signals S23A and S23B coming within a phase error amount "−5" to "+9" correspondingly to a counting operation range "0" to "7" of the counting circuit 75.

Figure 15A:
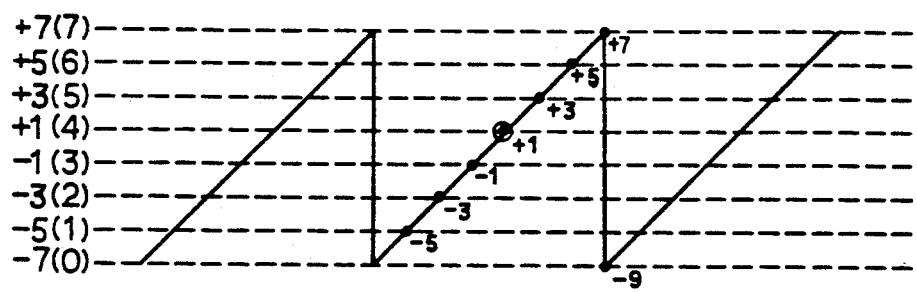
FIGS. 15A, 15B, 15C and 15D are schematic representation serving for illustration of a moving operation of the phase comparison operation range.
Figure 15B:
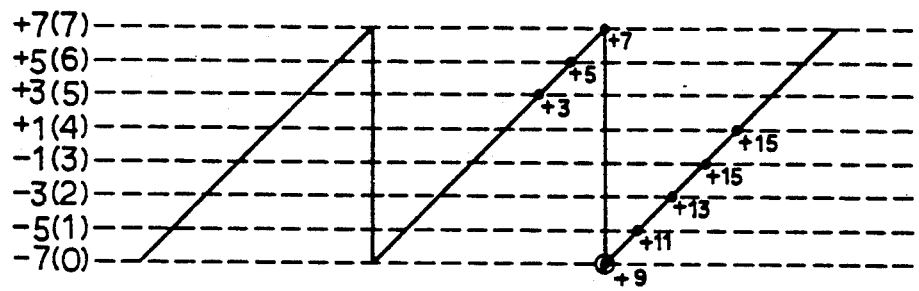

Meanwhile, as a result of such phase comparison operation, where a numeric value "+9" is held in the previous value holding circuit 78, as shown in FIG. 15(B), as the phase error signals S23A and S23B, the next phase comparison operation is such that when the counting circuit 75 sends the counting signal S43 of values "0" to "7", as indicated in a character position of the previous value "+9" of the conversion value table of FIG. 14, a value of phase error signals S23A and S23B shifts from "+3" to "+15" around the previous value "+9".

In the case of this embodiment, the phase error signals S23A and S23B are limited to "+15" as an upper bound value, and thus if the value of the phase error signals S23A and S23B rises thereafter, it is saturated at the upper bound value "+15".

Figure 15C:
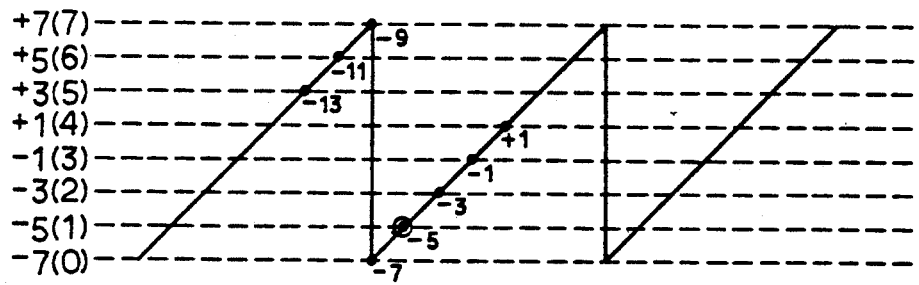

Then, as a result of phase comparison operation in the range of FIG. 15(A), when a numeric value "−5" is held in the previous value holding circuit 78, as shown in FIG. 15(C), the phase comparator circuits 44A and 44B operate for phase comparison in the range of numeric values "−13" to "+1" as the phase error signals S23A and S23B in accordance with the counting circuit 75 sending the counting signal S43 of values "0" to "7".

Figure 15D:
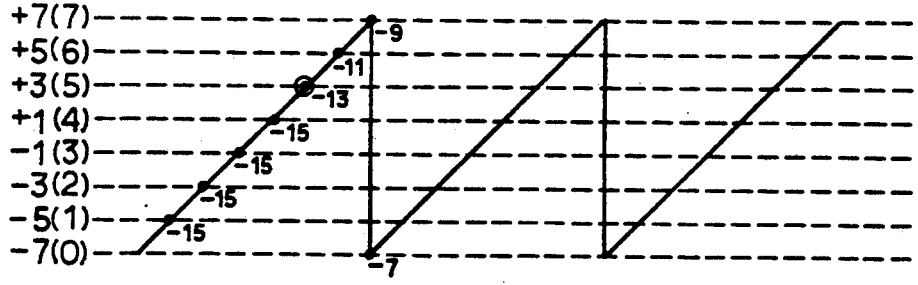

Further, if the previous value is "−13" as shown in FIG. 15(D), then when the counting circuit 75 sends the counting signal S43 of values "0" to "7" in the ensuing phase comparison operation, the phase error signals S23A and S23B move the range of phase comparison operation within the numeric values "−15" to "−7" accordingly thereto.

Thus in the phase comparator circuits 44A and 44B, even in case a phase comparison result of the same count value is obtained as the counting signal S43 of the counting circuit 75, the ensuing phase comparison operation can be moved to a phase comparison operation range around the previous value sent as the phase error signals S23A and S23B in the previous phase comparison operation, therefore the phase comparison range can further be enlarged substantially, and further a linear change may be produced so as not to cause discontinuity to a variation of the phase error signals S23A and S23B which can be obtained in result.

When subjecting the numerical controlling oscillation circuits 45A and 45B to a numerical control through the digital signal processing circuits 46A and 46B by means of the phase error signals S23A and S23B, such linear change is effective in preventing an unstable operation from resulting thereto, thus realizing a stable PLL leading operation.

The phase error signals S23A and S23B of the comparator circuits 44A and 44B are subjected to a predetermined weighting in a primary weighting circuit 81 of the digital signal processing circuits 46A and 46B, provided then to a primary addition circuit 82 and also to a secondary addition circuit 83.

An addition output 45 of the secondary addition circuit 83 is delayed by one sampling period in a secondary delay circuit 84, fed back then to the secondary addition circuit 83, and thus the secondary addition circuit 83 sends the addition output S45 indicating a total integrated value of the phase error signals S23A and S23B provided sequentially from the phase comparator circuits 44A and 44B.

The addition output S45 obtained through the secondary delay circuit 84 is fed to the primary addition circuit 82 by way of a secondary weighting circuit 85, thus an addition output for which a phase error amount obtained through the current phase comparison operation is added to a total phase error amount obtained through the phase comparison operation before the current phase comparison operation is carried out is obtained through the primary addition circuit 82, which is fed to the numerical controlling oscillation circuits 45A and 45B as feedback data S24A and S24B.

Figure 16:
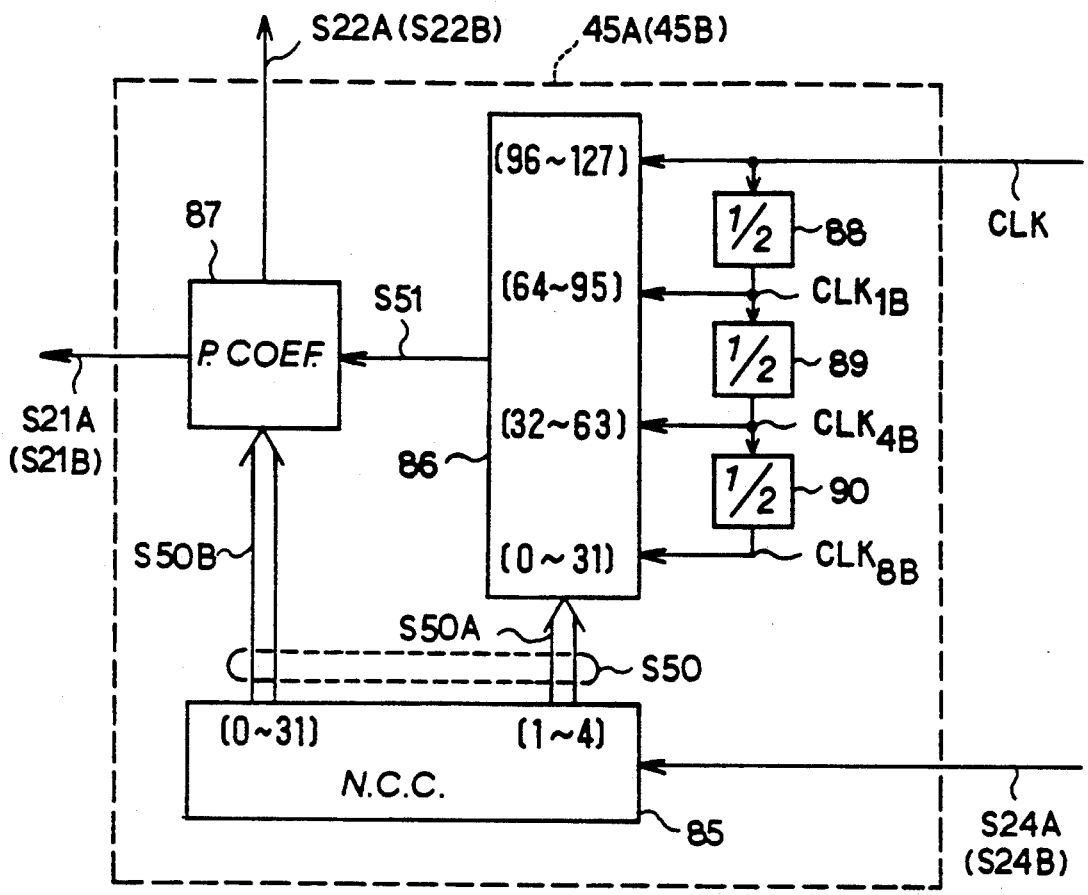
FIG. 16 is a block diagram representing a detailed configuration of a numerical controlling oscillation circuit of FIG. 11.

As shown in FIG. 16, the numerical controlling oscillation circuits 45A and 45B feed the feedback data S24A and S24B to the numerical controlling circuit 85, and generates a corresponding 7-bit numerical controlling signal S50.

The numerical controlling signal S50 feeds a 2-bit numerical signal S50A to a selector 86, and also feeds a 5-bit power signal to a power coefficient circuit 87.

The selector 86 receives a master clock CLK on an input end (96–127), receives a ½ divided clock CLK2 obtained from half-dividing the master clock CLK in a ½ divider circuit 88 on an input end (64–95), receives a ¼ divided clock CLK4 obtained from dividing the ½ divided clock CLK2 in a ½ divider circuit 89 on an input end (32–63), and further receives a ⅛ divided clock CLK8 obtained from dividing the ¼ divided clock CLK4B in a ½ divider circuit 90 on an input end (0–31).

Thus the master clock CLK, the ½ divided clock CLK2, the ¼ divided clock CLK4 and the ⅛ divided clock CLK8 input to the selector 86 are selected by the numerical signal S50A, and provided to the power coefficient circuit 87 as a selection output S51.

The power circuit 87 subjects a value x or the 32nd root of 2, as:

$$x = \sqrt[32]{2} \tag{11}$$

to a power arithmetic operation of $x^n$ as:

$$S21A\ (S21B) = x^n \tag{12}$$

according to the number n (n=0 to 31) to be input by the power signal S50B to be provided from the numerical controlling circuit 85, and sends a pulse train signal of a frequency f as in the case where a frequency of the selection output S51 is multiplied by the arithmetic operation result as a coefficient as the phase comparison signals S22A and S22B and also the PLL output pulses S21A and S21B.

In the configuration of FIG. 16, while the feedback data S24A and S24B are capable of taking a numeric value coming within "0" to "127", the numerical controlling circuit 85 divides the range into four coming in "0" to "31", "32" to "63", "64" to "95", "96" to "127", and sends the phase comparison signals S22A and S22B consisting of a pulse train signal of the frequency f changing in exponential function for each range.

That is, when the feedback data S24A and S24B come in the first range, or numeric values "0" to "31", the numerical controlling circuit 85 controls the selector circuit 86 to select the input end (0–31) by the selection signal S50A, thereby feeding the ⅛ divided clock CLK8 to the power coefficient circuit 87 as the selection output S51.

In addition thereto, the numerical controlling circuit 85 provides the power signal S50B representing the numeric value N to the power coefficient circuit 87 correspondingly to contents of the feedback data S24A and S24B being any one of the numeric values "0" to "31", thus generates a pulse train signal of the frequency f represented by:

$$f = X^N \cdot f_0 \quad (13)$$

with reference to a frequency $f_0$ of the $\frac{1}{8}$ divided clock $CLK_{8B}$, and as shown in FIG. 11 provides it to the counting circuit 75 of the phase comparator circuits 44A and 44B from the numerical controlling oscillation circuits 45A and 45B as the phase comparison signals S22A and S22B.

Figure 17:
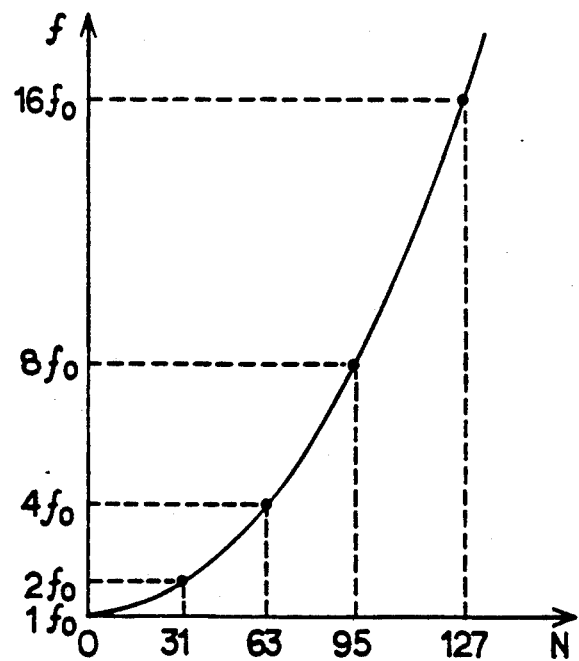
FIG. 17 is a characteristic curve representing the numerical frequency conversion characteristic.

Thus, as shown in FIG. 17, in the first range N="0" to "31", the numerical controlling oscillation circuits 45A and 45B may realize a change covering one octave from $1f_0$ to $2f_0$ in exponential function separately by 32 stages (having a step of about 1.03 times) as the frequency f of a pulse train signal of the phase comparison signals S22A and S22B.

Further, when values of the feedback data S24A and S24B become "32" to "63", the numerical controlling, circuit 85 has the numerical signal S50A select the $\frac{1}{4}$ divided clock CLK4 and the selection output S51 send it, and also feed numeric values "0" to "31" to the power coefficient circuit 87 as the power signal S50B.

Thus, when a value N of the feedback data S24A and S24B comes within "32" to "63", as shown in FIG. 17, the numerical controlling oscillation circuits 45A and 45B realize a change in 32 stages represented by the power signal S50B from the frequency $2f_0$ of the $\frac{1}{4}$ divided clock CLK4, and thus are capable of sending the phase comparison signals S22A and S22B consisting of a pulse train having a frequency one octave higher, namely a $4f_0$ frequency.

Likewise, when the feedback data S24A and S24B come within the third range or numeric value N="63" to "95" of FIG. 15, or within the fourth range of numeric values "95" to "127", the numerical controlling circuit 85 has the selector 86 select the $\frac{1}{2}$ divided clock CLK2 or the master clock CLK, feed it to the power coefficient circuit 87 as the selection output S51, and also provide numeric values "0" to "31" to the power coefficient circuit 87 as the power signal S50B. Thus, the phase comparator circuits S22A and S22B comprising a pulse train signal changing from frequency $4f_0$ or $8f_0$ of the $\frac{1}{2}$ divided clock CLK2 or the master clock CLK to frequency $8f_0$ or $16f_0$ one octave higher in exponential function by 32 steps respectively are made to send as outputs of the numerical controlling oscillation circuits 45A and 45B.

According to the configuration of FIG. 16, when data of the numeric value N changing linearly arrives as the feedback data S24A and S24B, it is made to generate a pulse train signal having a frequency changing in exponential function, therefore even if frequencies of the information data signals S20A and S20B provided to the phase comparator circuits 44A and 44B sharply disperse, the phase comparison signals S22A and S22B capable of following easily covering the full range of dispersed frequencies may be generated.

In this connection, when the phase error signals S23A and S23B become influential according to a frequency of the received information data fluctuates largely, the phase comparison signals S22A and S22B become also influential in exponential function accordingly with the result that a leading-in motion to the phase locked state is strengthened sharply when a fluctuation to come off the phase locked state arises, thus increasing a leading-in speed furthermore.

(4) Blocking of Information Data

In FIG. 2 an information data loaded in the information memory 11 of the information card 4 is so loaded in unit block data having a relatively small predetermined information content each, and when sending from the information memory 11 to the impedance variable circuit 14 as the information data S1, an arrangement is such that each unit block data is read repeatedly in the predetermined order.

Figure 18:
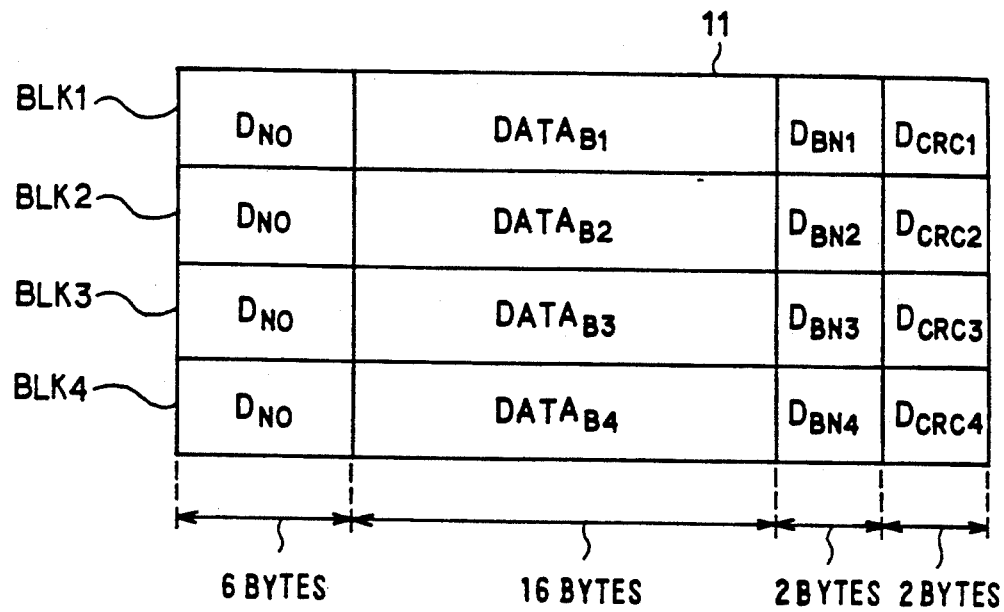
FIG. 18 and FIG. 19 are schematic representations serving for illustration of blocking of an information data.

In the case of this embodiment, the information data in the information memory 11 has four unit blocks BLK1 to BLK4 in blocking as shown in FIG. 18, and each block data has a 26-byte information content.

The unit block data BLK1, BLK2, BLK3 and BLK4 have 16 bytes of block data $DATA_{B1}$, $DATA_{B2}$, $DATA_{B3}$ and $DATA_{B4}$ respectively, 2 bytes of block No. data $D_{BN1}$, $D_{BN2}$, $D_{BN3}$ and $D_{BN4}$ assigned to the block data and 2 bytes of error detection code data $D_{CRC1}$, $D_{CRC2}$, $D_{CRC3}$ and $D_{CRC4}$ are added successively, and 6 bytes of common card No. data $D_{N0}$ indicating a card No. assigned to the card is added ahead of the block data $DATA_{B1}$, $DATA_{B2}$, $DATA_{B3}$ and $DATA_{B4}$.

Thus, the unit block data BLK1 to BLK4 have information capable of transmitting an information data alone each.

Figure 19:
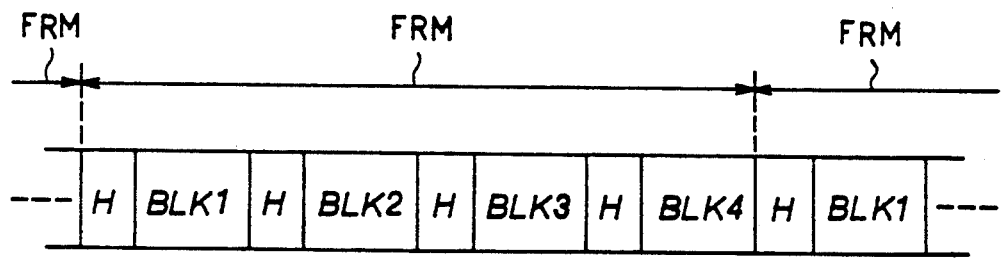

When sending the unit block data BLK1 to BLK4 in the information memory 11 out of the information card 4 the information memory 11 reads the unit block data BLK1, BLK2, BLK3 and BLK4 in that order, as shown in FIG. 19, to feed to the data encoder circuit 16, a header data H including a security code is added to each block data in the data encoder circuit 16, which is then subjected to a diphase modulation and sent to the impedance variable circuit 14.

Here, before reading the unit block data BLK1, BLK2, BLK3 and BLK4, the data encoder circuit 16 controls the address counter 13 to a state where it is stopped once for counting operation through the address counter control circuit 17, and the header data H is added in such state.

As a result the information card 4 sends one frame of frame data string FRM arraying the unit block data BLK1, BLK2, BLK3 and BLK4 with the header data H added thereto each in that order repeatedly in continuation from the dipole antenna 4B.

According to construction of FIG. 18 and FIG. 19, the information data to transmit is blocked as block data BLK1 to BLK4 with relatively less data volume, and is ready for transmitting independently at every block data, therefore an answer information signal W4 will be read by the information reader 1, thus enhancing a reading speed and a reading precision of the information data furthermore.

In this connection, when receiving the answer information signal W2 on the answer signal processing circuit 6, if a signal level of the answer information signal W2 is faint and the information card 4 moves, then there may be a case where a part of the one frame of frame data string FRM cannot be received or an error arises on the received information data as the answer information signal W2 is capable of being not received stably, and if so, the unit block data BLK1 to BLK4 of the one frame of frame data string FRM which has been received so far cannot be used as significant information and hence are abandoned, and a reception of the answer information signal W2 must be recommenced upon arrival of the normal answer information signal W2 thereafter, however, the reception can be recommenced from a timing of the first unit block data ready for receiving normally.

Figure 20A:
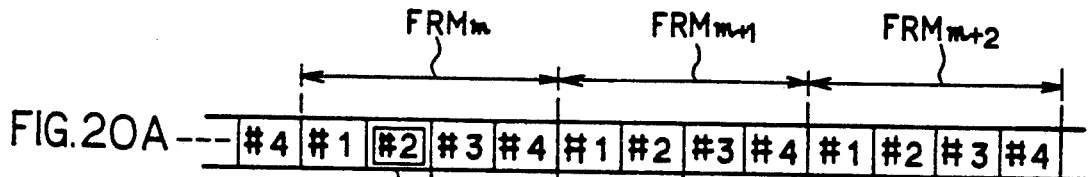
FIGS. 20A, 20B and 20C are schematic representation serving for illustration of an effect of blocking.
Figure 20B:
Figure 20C:
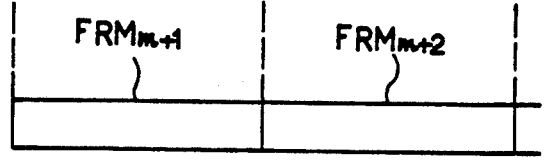

As shown in FIG. 20(A), for example, when the answer signal processing circuit 6 fails to receive normally the second unit block data of an m-th frame data string $FRM_m$ while one frame of frame data strings $FRM_m$, $FRM_{m+1}$, $FRM_{m+2}$ ... comprising the first to fourth unit block data BLK1 to BLK4 are transmitted continuously, if the third unit block data is ready for receiving normally therefrom, as shown in FIG. 20(B), then four unit block data from the third unit block data may be loaded as the m-th frame data string $FRM_m$.

Then, when transmitting the information data at every one frame of the frame data strings, as shown in FIG. 18(C), if there arises a state where a part of the m-th frame data string $FRM_m$ (FIG. 20(A)) is not for normal reception, then a normal reception is not realized until the next frame data string, namely the m+1-th frame data string $FRM_{m+1}$ arrives.

According to the constructions of FIG. 18 and FIG. 19 after all, the answer information signal W2 sent from the information card 4 can be received at every unit block data, and thus information can be read efficiently.

Particularly in the case of this embodiment where a microwave 2.45 [G Hz] or so in frequency is applied as a carrier wave, the point whereat a receiving signal becomes zero according to a phase amount α corresponding to the distance between the information card 4 and the information reader 1, that is, the null point is quite unavoidable, therefore in case, for example, the information card 4 moves at a constant speed, a signal cannot be received whenever the information card 4 passes the null point, and hence as shown in FIG. 20(B), the data can be loaded immediately whenever ready for receiving normally, thereby enhancing efficiency and precision of information reading operation of the information reader 1.

(5) Synthesis of Block Information Data

As described with reference to FIG. 18 and FIG. 19, when the information data blocked and so transmitted is decoded by the data decoder circuits 50A and 50B, the answer signal processing circuit 6 of the information reader 1 loads it into a data memory MEM (FIG. 21) provided on the working memory 52 by the CPU 51 through a procedure for synthesizing the block data shown in FIG. 21.

In this case the data memory MEM has information data memory parts M1, M2, ... Mj for storing information data read out of j pieces of the information cards 4 separately, and the information data memory parts M1, M2, ... Mj store the four unit block data BLK11 to BLK14, BLK21 to BLK24, ... BLKj1 to BLKj4 read as one frame data string FRM in memory areas with data write flags F11 to F14, F21 to F24, ... Fj1 to Fj4 respectively.

Card No. data BN1, BN2, ... BNj and timer data TM1, TM2, ... TMj of the read information cards 4 are stored in the unit block data BLK11 to BLK14, BLK21 to BLK24, ... BLKj1 to BLKj4, thus the unit block data BLK11 to BLK14, BLK21 to BLK24, ... BLKj1 to BLKj4 are written together with the data write flags F11 to F14, F21 to F24, ... Fj1 to Fj4, thereby forming control data working at the time of transmission.

Figure 22A:
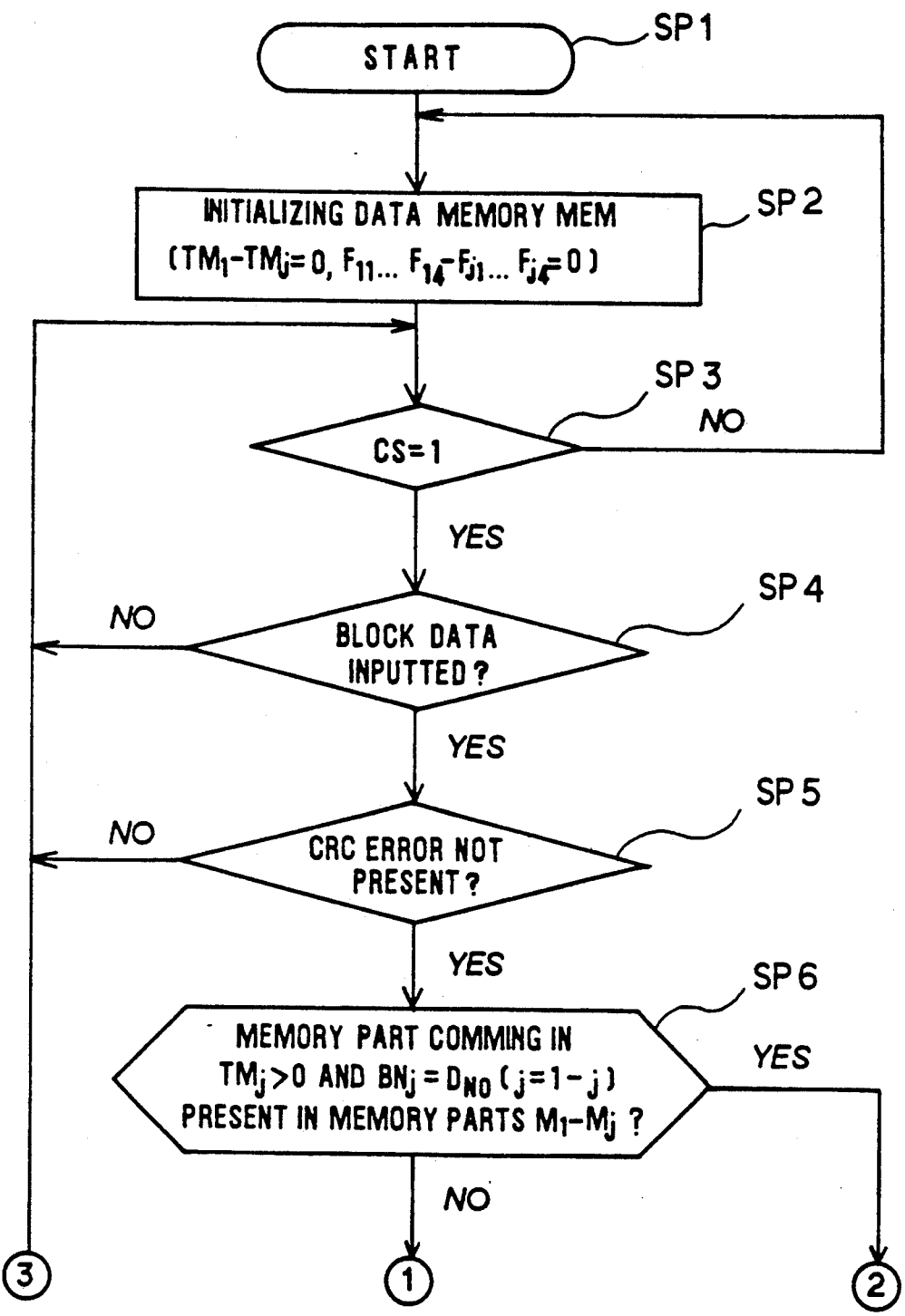
FIGS. 22A and 22B are flowchart indicating a procedure for synthesizing block data.
Figure 22B:
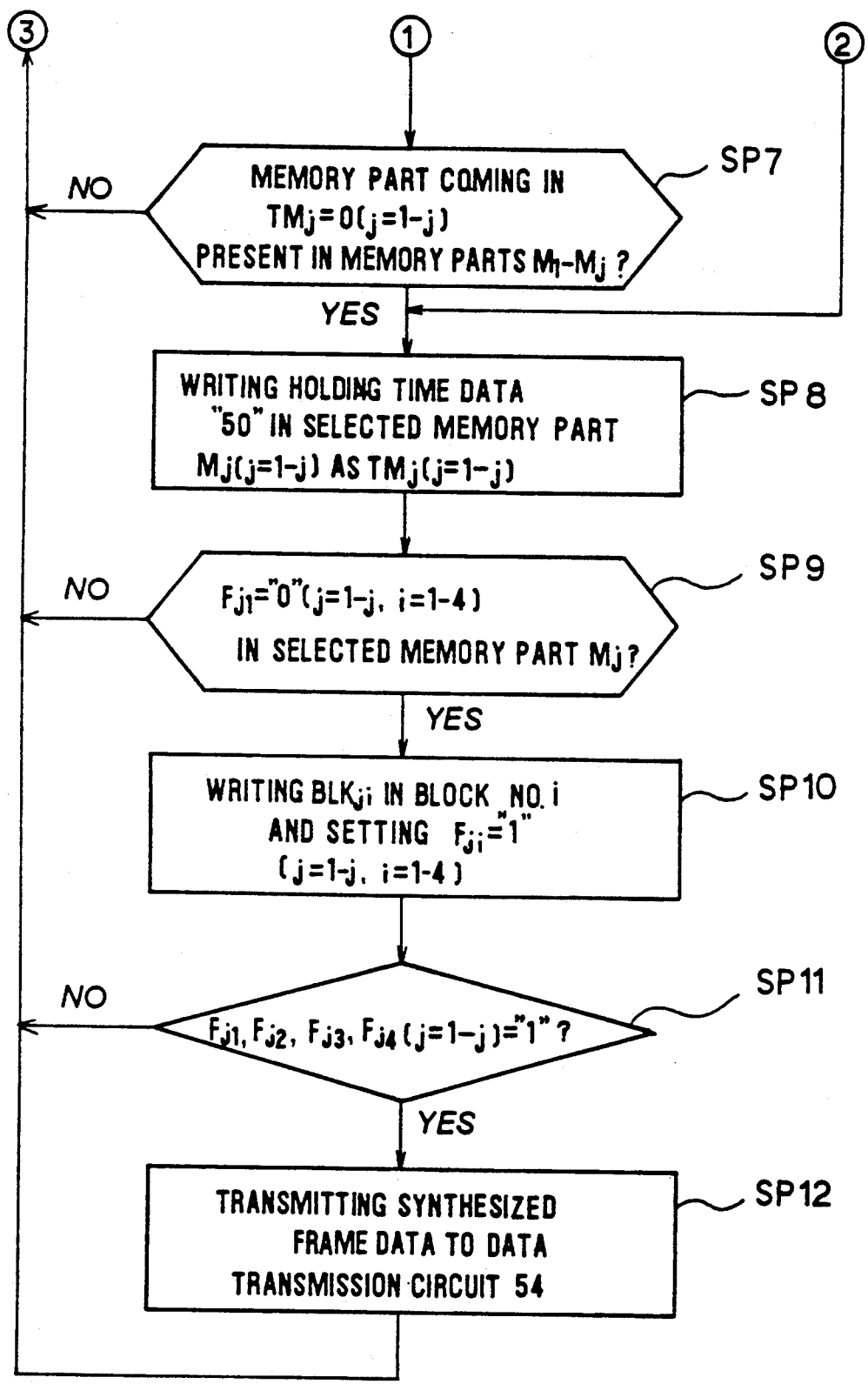

In the procedure for synthesizing the block data as shown in FIG. 22, the CPU 51 starts the procedure in step SP1, and then initializes control data of the data memory MEM, that is, the timer data TM1, TM2, ... TMj, the data write flags F11 to F14, F21 to F24, ... Fj1 to Fj4 in step SP2, thereby writing logic "0" data.

Then in step SP3, the CPU 51 decides whether or not a data synthesis permission signal CS is logic "1", and when a negative result is obtained (the data synthesis permission signal CS="0", inhibiting data synthesis), the CPU 51 returns to the aforementioned step SP2 to wait for the data synthesis permission signal CS coming to a logic "1" (releasing data synthesizing process from inhibition).

In the case of this embodiment, the data synthesis permission signal CS is provided to the CPU 51 externally, and when CS="0" from having the logic level changed as occasion demands, the unit block data received newly are written in the data memory MEM to inhibit the synthesis, and data having been written in the data memory MEM so far may all be abandoned.

When an affirmative result is obtained in step SP3, the CPU51 goes to step SP4 to decide whether or not the unit block data are input.

Here, if there is the information card 4 in communication currently present, the block data string FRM shown in FIG. 19 is input sequentially to the CPU 51 as the decode output S30A or S30B from the data decoder circuit 50A or 50B.

The CPU 51 then executes a decision of the step SP4 according to the header data H put to the unit block data BLK1 to BLK4.

Here, when an affirmative result is obtained, the CPU 51 decides whether or not an error is found on the data in step SP5 according to the error detection code data $D_{CRC1}$ to $D_{CRC4}$ (FIG. 18) of the unit block data BLK1 to BLK4.

Here, if an affirmative result is obtained, then it is confirmed that the unit block data BLK1 to BLK4 have been received correctly, and the CPU 51 executes the process including step SP6 and on in continuation, thereby executing the process for synthesizing block data according to the unit block data BLK1 to BLK4.

Then, if a negative result is obtained in step SP4 or step SP5, the CPU 51 returns to the aforementioned step SP3 without synthesizing the data.

In step SP6, the CPU 51 compares the card No. data $D_{NO}$ of the unit block data loaded currently with card No. data BN1 to BNj written in the memory parts M1 to Mj of the data memory MEM and selects the coincident memory part, and also ensures that the timer data TM1 to TMj of the selected memory part as described below are positive.

Here if a negative result is obtained, then it indicates that data was never received during the period of a past predetermined holding time (0.5 [sec] in the case of this embodiment) from the information card 4 having sent the block data BLK1 to BLK4 received currently, and the CPU 51 then goes to step SP7 to decide whether or not the memory part TMj=0 (j=1 to j) is present in those memory parts M1 to Mj.

The decision of the step SP7 signifies that a memory area not used for saving data or a so-called space memory area is searched out of the memory parts M1 to Mj, and when an affirmative result is obtained the CPU 51 goes to step SP8 to write a holding time data "50" signifying 0.5 second as the timer data TMj (j=1 to j) of the space memory area, thus the state is such that a write of the received unit block data has been reserved.

The timer data TMj is counted down by clock pulse with predetermined frequency so as to in this embodiment be counted down by 50 during the period of 0.5 seconds.

Then, if a negative result is obtained in the step SP7, this signifying that there is no space memory area in the memory parts M1 to Mj, then the CPU 51 abandons the received unit block data and returns to the step SP3.

Further, if an affirmative result is obtained in the step SP6, this signifying that there is the memory part Mj (j=1 to j) in which the unit block data BLK1 to BLK4 were written from the updated information memory during a past holding time, then the CPU 51 goes to step SP8 to rewrite the holding time data "50" in the timer data TMj (j=1 to j) of the memory area, thus a write of the newly received unit block data BLK1 to BLK4 in the memory area is reserved in state.

When such reserved state comes into existence, the CPU 51 goes to step SP9 and decides whether or not a data write flag Fji (j=1 to j, i=1 to 4) corresponding to a value i of the block No. data is "0" according to the block No. data $D_{BNi}$ (i=1 to 4) included in the currently received unit block data BLKj (j=1 to 4) in the selected memory part Mj (j=1 to j).

Here, if an affirmative result is obtained, this signifying that the block data BLKji (j=1 to j, i=1 to 4) has not been written in a memory area of the block No. i, then the CPU 51 goes to step SP10 to write the currently received unit block data in the block data memory area of the block No. i, and sets "1" to the data write flag Fji. Thus the CPU 51 is capable of keeping the currently received unit block data BLKi (i =1 to 4) written in the memory area selected for the sent information card 4.

On the other hand, if a negative result is obtained in step SP9, this signifying that the same block data of the same information card has already been written in the selected memory area, then the CPU 51 returns to the aforementioned step SP3 without renewing the data writing.

Continuously in step SP11, the CPU 51 decides whether or not the data write flags Fj1 to Fj4 (j=1 to j) of the selected memory part Mj (j=1 to j) come all to a logic "1" level.

Here, if a negative result is obtained, this signifying that all the unit block data BLK1, BLK2, BLK3, BLK4 are not loaded in the data memory MEM from the information card 4 in communication currently, then the CPU 51 returns to the step SP3 and prepares for the process to execute for receiving the unit block data not yet received and writing in the data memory MEM.

Then, if an affirmative result is obtained in step SP11, this signifying that all the unit block data BLK1, BLK2, BLK3, BLK4 could be loaded in the data memory MEM from the information card 4 currently in communication, then the block data have been synthesized completely.

In this case the CPU 51 goes to the next step SP12 to transmit the synthesized frame data to the data transmission circuit 54, and then returns to the aforementioned step SP3, thus waiting for arrival of new unit block data.

Figure 21:
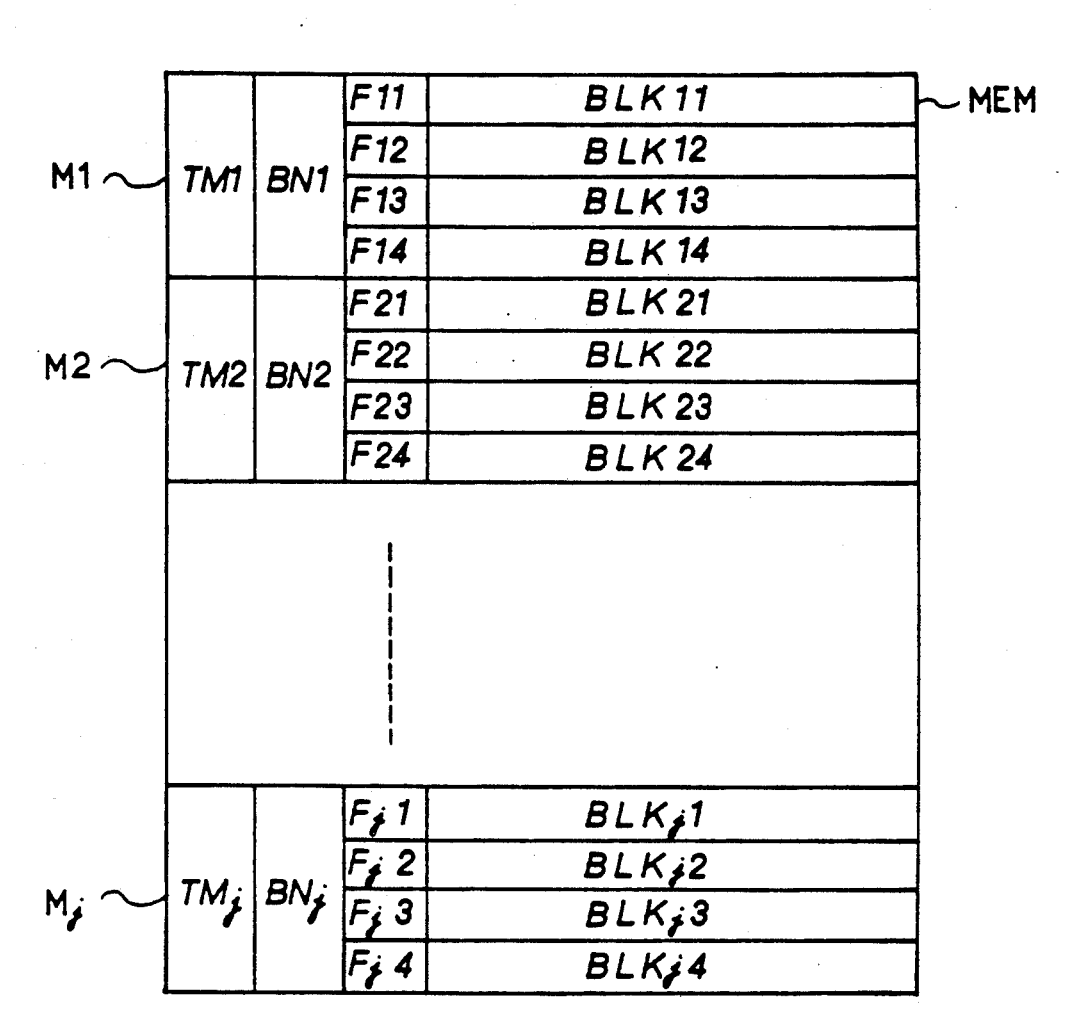

In the configuration of FIG. 21 and FIG. 22, the CPU 51 affirms the new block data whenever input in the step SP4, ensures that no data error arises in the step SP5, and then selects the corresponding memory area when there is present the data of the same card No. as the received card No. in the data memory MEM (steps SP6, SP8). Then, as observing a content of the data write flag Fji of the same block No. as that of the unit block data received in the selected memory part Mj, the unit block data received currently is written (steps SP9, SP10) when the data has not been written, and the data received newly is abandoned when the data has already been written.

Then, when the data of the same card No. as that card No. $D_{N0}$ of the received unit block data has not been written in the data memory MEM, the space memory part Mj (j=1 to j) is selected and the received unit block data is written in the memory part, but when there is not space memory area present, the block data received currently is abondoned instead of writing in the data memory MEM.

For the card No. data $D_{N0}$ of the unit block data thus received, when one frame of, that is, four block data are all written in the data memory MEM, this being affirmed by the data write flag Fji (step SP11), a synthesis of the received block data is closed.

According to the above-described construction, when an information card comprising a plurality of block data in blocking is transmitted sequentially from a plurality of the information cards 4, these will be synthesized to realize the received information data securely.

(6) Other Embodiments (6-1) In the embodiment given in FIG. 18 and FIG. 19, the description has referred to a case where the header data H having a security data each are put to the unit block data BLK1 to BLK4 comprising the card No. data $D_{N0}$, the block data $DATA_{B1}$ to $DATA_{B4}$, the block No. data $D_{BN1}$ to $D_{BN4}$ and the error detection code data $D_{CRC1}$ to $D_{CRC4}$, which are transmitted as one frame of frame data FRM, however, the security data may be put in the card No. data $D_{N0}$ to transmission instead of putting the security data in the header data H or in addition thereto.

(6-2) In the above-described embodiment, the case where this invention is applied to the information card is described, however, this invention is not necessarily limited thereto, and in short the invention may be applied extensively to a case where the information data is read from an information source sending the information data repeatedly.

(6-3) In the case of embodiment of FIG. 14, the master clock CLK has three stages divided by the ¼ divider circuits 88, 89 and 90, however, the dividing ratio is not necessarily limited thereto, and hence may be modified as occasion demands.

Further, powers 0 to 31 and the value x of the power coefficient circuit 87 may be modified as occasion demands.

(6-4) In the case of embodiment of FIG. 14, a conversion arithmetic operation from the feedback data S24A and S24B into the phase comparison signals S22A and S22B is carried out by hard means, however, this may be carried out by soft means as well.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A data transfer system comprising at least one portable device and at least one outside reading device whereby information is transmitted from said portable device to said outside reading device, said portable device comprising:
first memory means for storing said information which comprises a plurality of data blocks, each of said data blocks comprising at least an information data, a block identification data and an error check data;
transmitting means for transmitting said information to said outside reading device wherein each of said data blocks is a unit of data transmission; and said outside reading device comprising:
a first sequence answer signal loading circuit having a first phase shift circuit and a first mixing circuit;
a second sequence answer signal loading circuit having a second phase shift circuit and a second mixing circuit, wherein an answer information signal is converted into a pair of mixed outputs with the phase shifted 90° to each other, said mixed outputs being supplied to a receiving means;
said receiving means further receiving said data blocks transmitted by said portable device;
error checking means for selectively error checking and said data blocks with said error check data;
second memory means for storing said data blocks when said data block is obtained with no error; and
data processing means for reading said data blocks from said second memory means after all of said data blocks of a portable device are stored in said second memory means and for processing said data blocks read.

2. A data transfer system according to claim 1, wherein each of said data blocks further comprises a portable device identification data for identifying said portable device.

3. A data transfer system according to claim 2, wherein said second memory means has memory area for a plurality of said portable devices.

4. A data transfer system according to claim 1, wherein said data processing means reads said data blocks from said second memory only when all of said data blocks of the portable device are stored in said second memory means in a predetermined time period.

5. A data transfer system according to claim 1, wherein said portable device further comprises,;
header adding means for adding header data to each of said data blocks whereby a set of said data blocks and said header data is a unit of the data transmission.

6. A data transfer system comprising at least one portable device and at least one outside reading device wherein information is transmitted from said portable device to said outside reading device, said portable device comprising:
first memory means for storing said information which comprises a plurality of data blocks;
adding means for adding a device identification data to identify said portable device, a block identification data to identify said data block and an error check data to selectively check and correct data error to each of said data blocks, said adding means comprising a data encode circuit and address counter control circuit;
transmitting means for transmitting said information to said outside reading device wherein each set of said data blocks, said device identification data, said block identification data and said error check data is a unit of data transmission; and said outside reading device comprising:
receiving means for receiving said data blocks transmitted by said portable device;
error checking means for selectively error checking and correcting said data blocks with said error check data;
second memory means for storing said data blocks when said data block is obtained with no errors; and
data processing means for reading said data blocks from said second memory means after all of said data blocks of a portable device are stored in said second memory means and for processing said data blocks read.

7. A portable device for storing and transmitting information data to at least one outside reading device comprising:
memory means for storing said information which comprises a plurality of data blocks, each of said data blocks comprising an information data, a device identification data to identify said portable device, a block identification data to identify said data block and an error check data to selectively check and correct data error; and
transmitting means for transmitting said information to said outside device wherein each of said data blocks is a unit of data transmission.

8. A data transfer system comprising at least one portable device and at least one outside reading device, whereby an information signal is transmitted from said portable device to said outside reading device:

said portable device comprising:
memory means for storing said information signal; and
transmitting means for transmitting said information signal to said outside device, and said outside reading device comprising:
receiving means for receiving said information signal transmitted by said portable device;
analogue to digital converter means for sampling and converting said information signal to a digital information signal;
digital band pass filter means for filtering said digital information signal, said digital band pass filter means having a passing frequency band corresponding to data rate of said information signal;
phase locked loop circuit means for generating output pulses which are synchronous with said digital information signal filtered by said digital band pass filter means whereby said output pulses are supplied to said analogue to digital converter means and said digital band pass filter means as driving clock pulses.

9. A data transfer system according to claim 8, wherein said phase locked loop circuit means comprises:
- oscillator means for generating a master clock signal;
- dividing counter means for dividing said master clock signal and for generating a plurality of clock signals each of which has a different frequency;
- multiplexer means for selecting one of said clock signals;
- means for receiving the selected one of said clock signals and for raising the frequency of said selected one of said clock signals to the Nth power so that frequency-raised clock signal is generated; and
- phase comparator means for phase-comparating said frequency-raised clock signal and said digital information signal filtered by said digital band pass filter means and for generating a control signal according to the comparison result wherein said control signal controls said multiplexer means and determines the number N.

* * * * *